Oct. 22, 1968  G. A. HUGHES ETAL  3,407,217
8-ISO-13-POLYCARBONALKYL GONANES
Filed June 7, 1965  3 Sheets-Sheet 1

INVENTORS
GORDON A. HUGHES
HERCHEL SMITH

Oct. 22, 1968  G. A. HUGHES ETAL  3,407,217
8-ISO-13-POLYCARBONALKYL GONANES
Filed June 7, 1965  3 Sheets-Sheet 2

INVENTORS
GORDON A. HUGHES
HERCHEL SMITH
BY Vito Victor Bellino
ATTORNEY

United States Patent Office 3,407,217
Patented Oct. 22, 1968

3,407,217
8-ISO-13-POLYCARBONALKYL GONANES
Gordon Alan Hughes, Wayne, Pa., and Herchel Smith, 500 Chestnut Lane, Wayne, Pa. 19087; said Hughes assignor to said Smith
Original application Oct. 4, 1962, Ser. No. 228,384. Divided and this application June 7, 1965, Ser. No. 461,909
25 Claims. (Cl. 260—397.4)

ABSTRACT OF THE DISCLOSURE

Unsaturated 8-isogonane compounds and intermediates for the preparation of unsaturated 8-isogonane compounds which possess estrogenic, anti-lipemic, progestational, anabolic, and androgenic activities are obtained by selectively introducing hydrogen in a cis configuration at the 8-, 9-, and 14-positions of the corresponding 1,3,5(10),8,14-gonapentaene in the presence of a hydrogenation catalyst.

---

This application is a division of co-pending application Ser. No. 228,384 filed Oct. 4, 1962, which is a continuation-in-part of applications Ser. No. 57.904 filed Sept. 23, 1960; Ser. No. 91,841 filed Feb. 24, 1961; Ser. No. 137,535 filed Sept. 12, 1961; Ser. No. 195,000 filed May 15, 1962; and Ser. No. 196,557 filed May 16, 1962, now abandoned.

This invention relates to compositions of matter classified in the art of chemistry as substituted unsaturated-8-isogonane derivatives, to intermediates therefor, and to processes for making and using such compositions.

In describing the invention, reference will be made in the following specification to the annexed drawings, wherein:

FIGURE 1 illustrated schematically the recation sequence for preparing a 13-alkyl-8-isogon-5(10)-ene, specifically 13β-ethyl-17α-ethynyl-17β-hydroxy-8-isogon-5(10)-en-3-one (XV).

Figure 8:
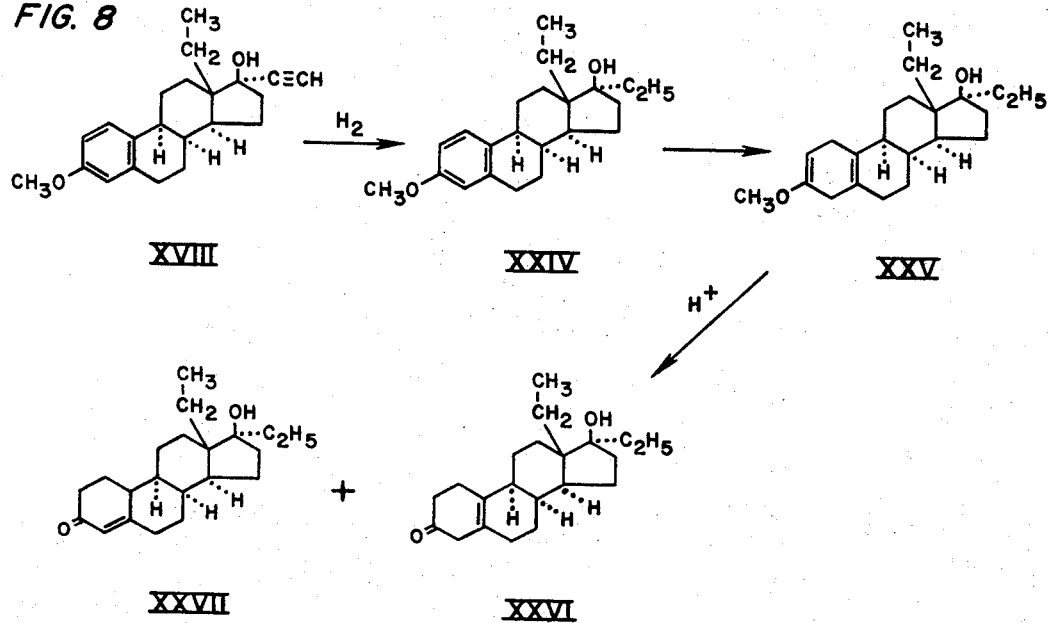

FIGURE 8 illustrates schematically the reaction sequence for preparing a mixture of a 13,17-dialkyl-8-isogon-4-en-17-ol and a 13,17-dialkyl-8-isogon-5(10)-en-17-ol from a 13-alkyl-17-alkynyl-3-alkoxy-8-isogona-1,3,5-(10)-trien-17-ol, specifically 13β,17α-diethyl-17β-hydroxy-8-isogon-5(10)-en-3-one (XXVI) and 13β,17α-diethyl-17β-hydroxy-8-isogon-4-en-3-one (XXVII) from 13β-ethyl-17α-ethynyl - 3 - methoxy - 8 - isogona-1,3,5(10)-trien-17β-ol (XVIII).

The invention sought to be patented in a principal composition aspect is described as residing in the concept of a chemical compound having an unsaturated 8-isogonane nucleus and having attached thereto in the 13-position a monovalent polycarbon-alkyl radical.

The tangible embodiments of the composition aspect of the invention possess the inherent general physical properties of being white crystalline solids, are substantially insoluble in water and are generally soluble in polar solvents such as dimethyacetamide. Examination of compounds produced according to the hereinafter described process reveals, upon ultraviolet and infrared spectographic analysis, spectral data supporting the molecular structures herein set forth. The aforementioned physical characterities, taken together with the nature of the starting materials and the mode of synthesis, confirm the structure oft he compositions sought to be patented.

The tangible embodiments of the invention posses the inherent applied use characteristics of exerting qualitatively varying hormonal effects in animals as evidenced by pharmacological evalution according to standard test procedures. Such tangible embodiments show estrogenic, androgenic, anti-estrogenic, progestational, blood lipid effects, and anabolic actions, salt retention, salt excretion and central nervous system effects. This finding indicates their usefulness in the treatment of female hypogonadism, amenorrhea, dysmenorrhea, ovulation block and contraception, functional uterine bleeding, acne, osteoporosis, infertility, pregnancy maintenance, habitual abortion, weight gain and nitrogen retention, growth stimulation, post operative recovery, healing of wounds, and healing of burns. In particular it has been established that alterations of the natural steroid structure made possible by our discovery result not merely in a change of degree of hormonal activity but, as result of the separation of types of hormonal activity, alter in an unexpected way its basic nature so that a desirable hormone effect is maximized and an undesirable hormone effect is minimized.

In addition to their inherent applied use characteristics, the intermediate compositions of this invention are useful in practicing the process aspect of the present invention in the making of the principal 8-isogonane compositions of the invention according to the sequence of reactions described herein.

Figure 1:
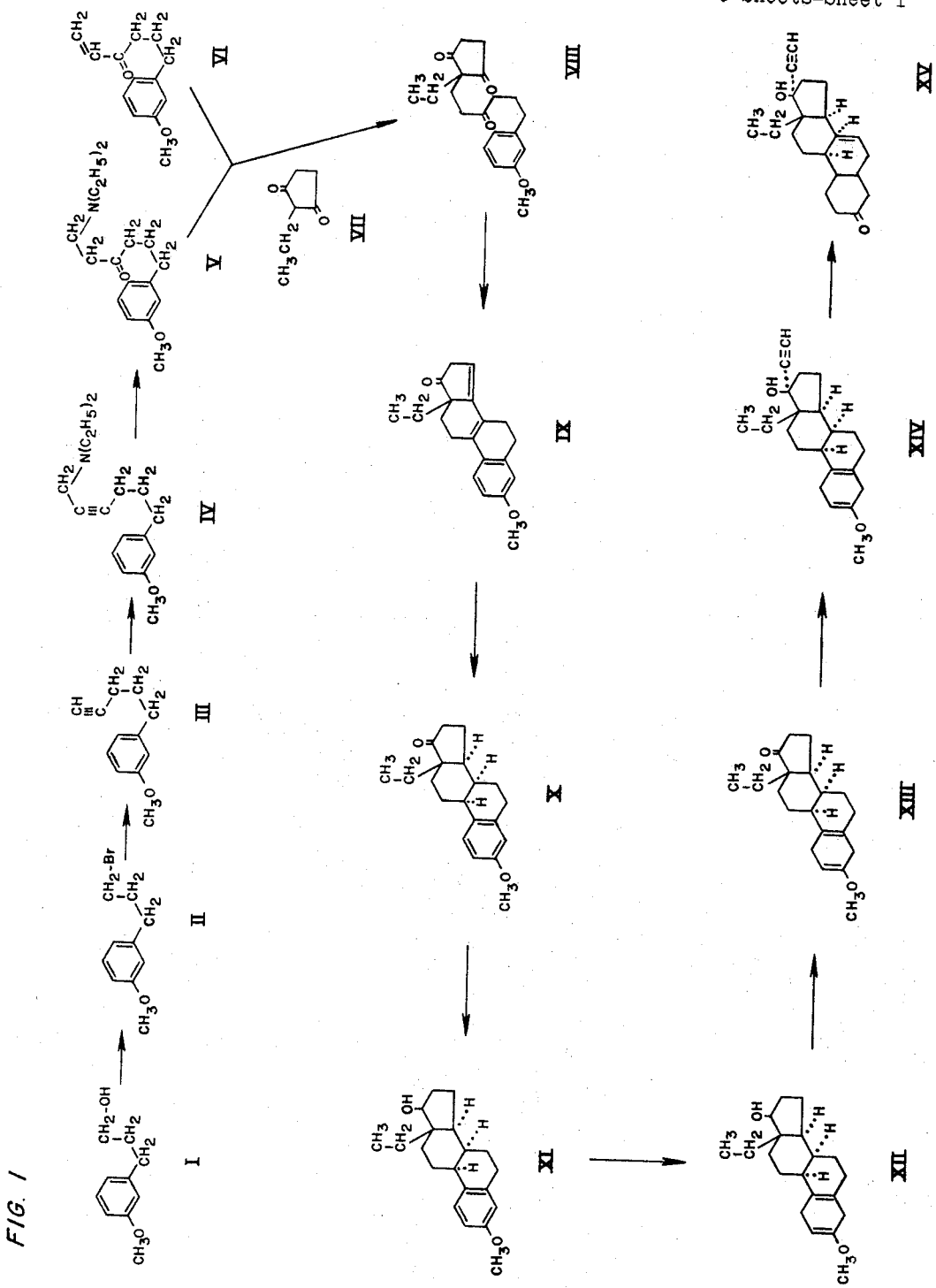
Figure 4:
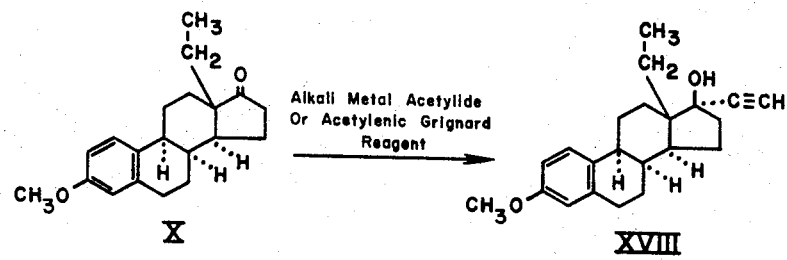
FIGURE 4 illustrates schematically the reaction sequence for preparing a 17-alkynyl-13-alkyl-3-methoxy-8-isogona-1,3,5-triene from a 13-alkyl-3-methoxy-8-isogona-1,3,5(10)-trien-17-one, specifically 13β-ethyl-17α-ethynyl-3-methoxy-8-isogona-1,3,5(10)-trien-17β-ol (XVIII) from 13β-ethyl-3-methoxy-8-isogona-1,3,5(10)-trien-17-one (X).

The invention sought to be patented in a second composition aspect is described as residing in the concept of an 8-isogona-1,3,5-(10)-triene nucleus having attached thereto in the 13-position a monovalent polycarbon-alkyl radical (FIGURE 1, X, XI; FIGURE 4, XVIII; FIGURE 8, XXIV).

The tangible embodiments of said second composition aspect possess the use characteristic of exerting hormonal effects as evidenced by standard test procedures. Furthermore said tangible embodiments of said composition aspect possess the use characteristic of being intermediates for the preparation of compositions exerting hormonal effects as evidenced by standard test procedures.

The invention sought to be patented in a third composition aspect is described as residing in the concept of an 8-isogona-2,5(10)-diene nucleus having attached thereto in the 13-position a monovalent polycarbon alkyl radical (FIGURE 1, XII, XII and XIV; FIGURE 8, XXV).

The tangible embodiments of said third composition aspect possess the use characteristic of varying hormone effects in animals as evidenced by pharmacological evaluation by standard test procedures. Furthermore said tangible embodiments possess the use characteristic of being intermediates for the preparation of compositions exerting hormonal effects as evidenced by standard test procedures.

Figure 5:
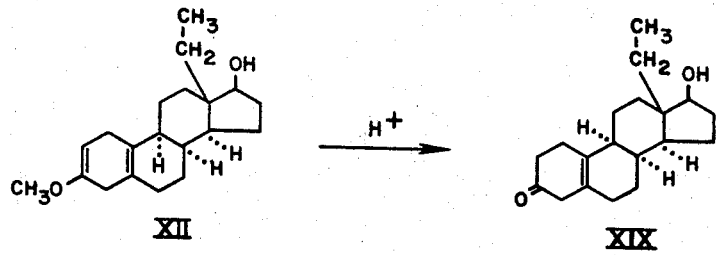
FIGURE 5 illustrates schematically the mild acid hydrolysis of a 13-alkylgona-2,5(10)-diene to a 13-alkylgon-5(10)ene, specifically 13β-ethyl-3-methoxy-8-isogen-2,5-(10)-dien-17β-ol (XII) to 13β-ethyl-17β-hydroxy-8-isogen-5(10)-en-3-one (XIX).

The invention sought to be patented in a fourth composition aspect is described as residing in the concept of a compound having an 8-isogon-5(10)-ene nucleus having attached thereto in the 13-position a monovalent polycarbonalkyl radical (FIGURE 1, XV; FIGURE 5, XIX).

The tangible embodiments of said fourth composition aspect possess the use characteristic of exerting varying hormone effects in animals as evidenced by pharmacological evaluation including estrogenic and lipid shifting effects. Furthermore said tangible embodiments of said fourth composition aspect possess the use characteristic of being important intermediates for the preparation of compositions exerting hormonal effects as evidenced by standard test procedures.

Figure 6:
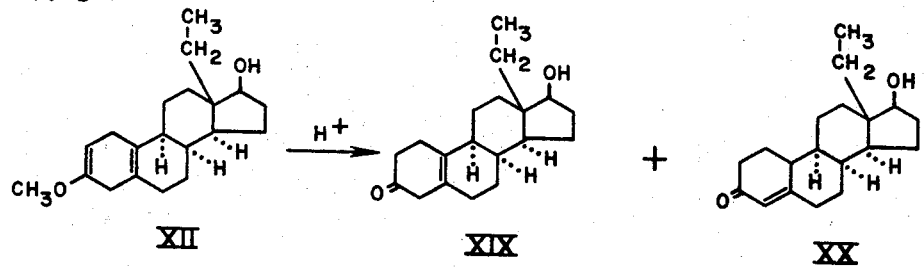
FIGURE 6 illustrates schematically the mineral acid hydrolysis of a 13-alkyl-2-isogon-5(10)-ene, specifically 13β-ethyl-3-methoxy-8-isogona-2,5(10)-dien-17β-ol (XII) to 13β-ethyl-17β-hydroxy-8-isogon-4-en-3-one (XIX) and 13β-ethyl-17β-hydroxy-8-isogon-5(10)-en-3-one (XX).

The invention sought to be patented in a fifth composition aspect is described as residing in the concept of a mixture of a compound having an 8-isogon-5(10)-ene nucleus and the correspondingly substituted compound having an 8-isogon-4-ene nucleus, both of said gonenes having attached thereto in their 13-positions a monovalent polycarbon alkyl radical (FIGURE 6; XIX and XX; FIGURE 8, XXVI and XXVII).

The tangible embodiments of said fifth composition aspect possess the use characteristic of exerting hormonal effects as evidenced by standard test procedures.

The invention sought to be patented in a sub-generic composition aspect is described as residing in the concept of a 13-polycarbonalkyl-8-isogona-1,3,5(10)-trien-17-ol (FIGURE 1; XI), of which a specific embodiment, 13β-ethyl-3-methoxy-8-isogona-1,3,5(10)-trien-17β-ol is hereinafter described.

The tangible embodiments of said sub-generic composition aspect possess the use characteristic of varying hormone effects in animals as evidenced by pharmacological evaluation by standard test procedures. In clinical tests, said specific embodiment has been effective in the control of post-menopausal syndrome.

The invention sought to be patented in a second subgeneric composition aspect is described as residing in the concept of 17-alkynyl-13-polycarbonalkyl-8-isogona-1,3,5(10)-trien-17-ol (FIGURE 4; XVIII) of which a specific embodiment, 13β-ethyl-17α-ethynyl-8-isogona-1,3,5(10)-trien-17β-ol, is hereinafter described.

The tangible embodiments of said second sub-generic composition aspect possess the use characteristic of varying hormone effects in animals, as evidenced by pharmacological evaluation by standard test procedures, and in particular have demonstrated a high pituitary blocking activity, coupled with an unexpected separation of activities.

The invention sought to be patented in a third subgeneric composition aspect is described as residing in the concept of a 17 - alkynyl - 13-polycarbonalkyl-8-isogon-5 (10)-ene (FIGURE 1; XV) of which a specific embodiment, 13β - ethyl-17α-ethynyl-8-isogon-5(10)-en-17β-ol-3-one, is hereinafter described.

The tangible embodiments of said third sub-generic composition aspect possess the use characteristic of varying hormone effects in animals, as evidenced by pharmacological evaluation by standard test procedures, and in particular in certain instances pituitary blocking effects accompanied by unexpected separation of activities.

The invention sought to be patented in a process aspect, is described as residing in the concept of catalytically hydrogenating a compound having a gona-1,3,5(10),8,14-pentaen-17-one nucleus in the presence of a solvent to obtain the corresponding compound having an 8-isogona-1,3,5(10)-trien-17-one nucleus, i.e., a gona-1,3,5(10)-trien-17-one in which the 8-position hydrogen is in an α configuration instead of the β configuration of the natural gonane structure (XX).

The manner and process of making and using the invention will now be generally described so as to enable a person skilled in the art of chemistry to make and use the same, as follows:

Referring now to FIGURE 1, wherein the compounds are assigned Roman numerals for identification schematically, the sequence of reactions involved in the synthesis of a specific embodiment, namely, 13β-ethyl-17α-ethynyl-17β-hydroxy-8-isogon-5(10)-en-3-one is illustrated. 3-(m-Methoxyphenyl) propanol (I) is heated with phosphorus tribromide in benzene after dropwise addition in the cold to form 3- (m-methoxyphenyl)propyl bromide (II). This halogen compound (II) dissolved to tetrahydrofuran is condensed with sodium acetylide in liquid ammonia to obtain 5 - (m-methoxyphenyl) - 1 - pentyne (III). Compound III is allowed to stand under nitrogen with water, 30% formalin, acetic acid, diethylamine, dioxan, and cuprous chloride at 70° C. for about 12 hours, whereby the is obtained 1-diethylamino-6-(m-methoxyphenyl)-2-hexyne (IV), which is in turn hydrated in the presence of a mercury salt and sulfuric acid to form 1-diethylamine on distillation to give the vinyl ketone 6-(m-methoxyphenyl)-1-hexan-3-one (VI). Either the ketamine (V) or the ketone (VI), or mixtures thereof, is then reacted with 2-ethyl-1,3-cyclopentanedione (VII) under Michael condensation conditions, e.g. refluxing in methanolic potassium hydroxide to form 2-ethyl-2-[6-(m-methoxyphenyl) - 3 - oxohexyl] - 1,3 - cyclopentanedione (VIII).

Compound VIII is then cyclodehydrated at the reflux temperature of a solvent, such as benzene, in the presence of a dehydrating acid, such as p-toluene sulfonic acid, to effect simultaneous ring closures to give the tetracyclic compound 13β - ethyl - 3 - methoxygona-1,3,5(10),8,14-pentaen-17-one (IX). The 8 and 14-unsaturation of Compound IX is then hydrogenated in the presence of a metal catalyst, such as 10% palladized carbon, to form 13β-ethyl - 3 - methoxy-8-isogona-1,3,5(10)-trien-17-one (X). Reduction of the carbonyl group of Compound X to a hydroxymethylene group, as with sodium borohydride in an alcohol, then gives 13β-ethyl-3-methoxy-8-isogona-1,3,5(10)-trien-17β-ol XI, which, by alkali metal reduction in liquid ammonia in the presence of a proton donor such as ethanol (Birch reduction), is converted to 13β-ethyl - 3 - methoxy - 8 - isogon-2,5(10)-dien-17β-ol (XII) which, on Oppenauer oxidation, gives 13β-ethyl-3-methoxygona-2,5(10)-dien-17-one (XIII). Ethynylation at the 17-position of compound XII with lithium acetylide in dimethylacetamide gives 13β-ethyl-17α-ethynyl-3-methoxy-8-isogona-2,5(10)-dien-17β-ol XIV. By acid hydrolysis with a weak acid such as oxalic acid compound XIV is converted to compound XV, 13β-ethyl-17α-ethynyl-17β-hydroxy-8-isogon-5(10)-en-3-one XV.

Figure 7:
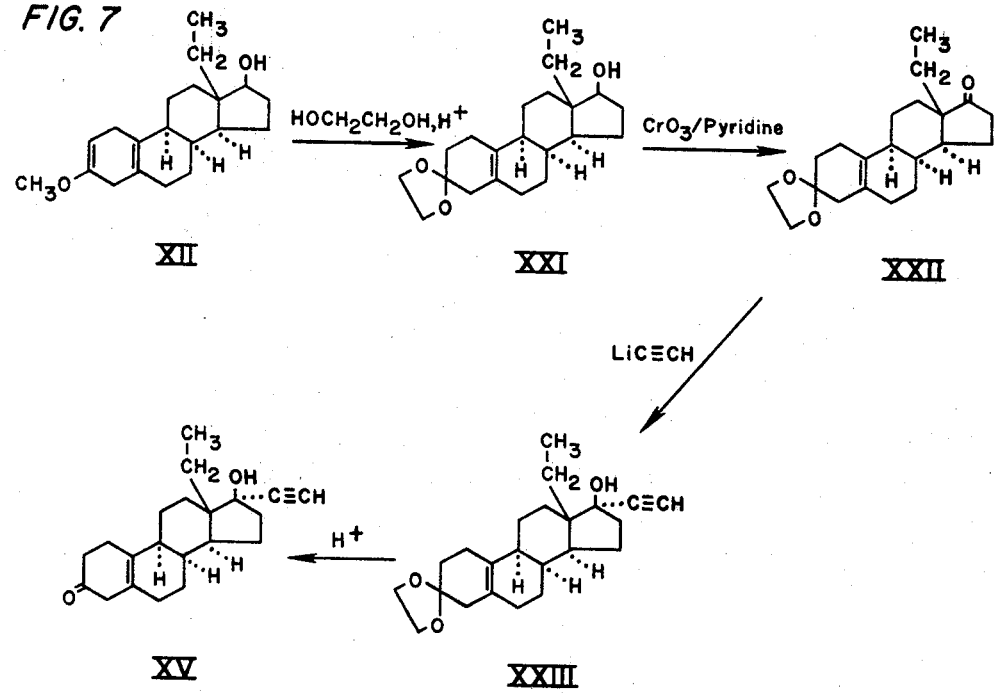
FIGURE 7 illustrates schematically the reaction sequence for preparing a 13-alkyl-17-alkynyl-17β-hydroxy-8-isogon-5(10)-ene-3-one for a 13-alkyl-3-alkoxy-8-isogona-2,5(10)-dien-17-ol, specifically 13β-ethyl-17α-ethynyl 17β-hydroxy-8-isogon-5(10)-en-3-one (XV) from 13β-ethyl-3-methoxy-8-isogon-2,5(10)-dien-17β-ol (XII).

Referring to FIGURE 7, an alternate route for the preparation of the gon-5(10)-ene XV starts from the gona-2,5(10)-diene XII through an initial reaction with ethylene glycol in refluxing benzene in the presence of toluene p-sulfonic acid as catalyst to give the ketal 13β-ethyl - 3,3 - ethylenedioxy - 8 - isogon-5(10)-en-17β-ol (XXII), which on oxidation of the 17-hydroxyl group with chromium trioxide in pyridine, gives 13β-ethyl-3,3,-ethylenedioxy-8-isogon-5(10)-en-17-one (XXII). Ethynylation at the 17-position with lithium acetylide-ethylenediamine complex in dimethylacetamide converts compound XXII to 13β-ethyl-3,3-ethylenedioxy-17α-ethynyl-8-isogon-5(10)-en-17β-ol (XXIII), which, by mild acid hydrolysis, affords the 13β-ethyl-17α-ethynyl-8-isogon-5(10)-en-17β-ol XV.

Referring to FIGURE 8 the compound XVIII, serves as a starting material for the preparation of the mixture of 8-isogon-5(10)-ene XXVI and the 8-isogon-4-ene XXVII through an initial hydrogenation in benzene in the presence of a palladium catalyst, so as to afford 13β,17α - diethyl - 3 - methoxy-8-isogona-1,3,5(10)-trien-17β-ol XXIV, which, on reduction with lithium and an alcohol in liquid ammonia (Birch reduction), gives 13β,-17 - diethyl - 3-methoxy-8-isogona-2,5(10)-dien-17β-ol (XXV).

Hydrolysis of compound XXV with mineral acid gives a mixture of the 13β, 17α-diethyl-17β-hydroxy-8-isogon-5(10)-en-3-one (XXVI) and 13β-17α-diethyl-17β-hydroxy-8-isogon-4-en-3-one (XXVII).

While the hereinbefore described processes produce novel and steroidal-like compounds which have an unnatural substituent at the 13-position, it is apparent that the novel and valuable processes of the invention offer a unique feasible route to the 8-isomers of the corresponding natural steroids if the nucleophilic compound used in the Michael condensation step is 2-methyl-1,3-cyclopentanedione.

The aromatic ring of the phenylpropanol (FIGURE 1, I) used as the starting material for the preparation of the compositions and initial preparations of the invention may have one or more substituents, provided, however least one position ortho to the position of propanol-chain attachment is unsubstituted so that cyclodehydration to form a cyclic structure can eventually be effectuated. To activate such ortho position of said subsequent ring closure, an ortho-para-directing group (referring to electrophilic aromatic substitution) such as hydroxy, acyloxy, alkoxy, amino, alkylamino or acylamino is a necessary substituent on the aromatic ring. The term "para-directing group (referring to electrophilic aromatic substitution)" as used herein means an activating group such as those hereinbefore listed and which activate all positions on the aromatic nucleus. Thus, if the group is para-directing, as defined above, it can be in a position meta to the ortho position to which ring closure is limited by steric considerations, said position being activated even though another position is more highly activated. Ring closure would not occur at the said more highly activated position because of the above mentioned steric limitations. The group may be present initially or may be introduced later but before ring closure, either directly, or by conversion from a meta-directing group such as nitro. After the tetracyclic structure has been formed, substituents can be introduced into the aromatic A-ring which are not limited as above; however, if such substituted compound is to undergo a reduction, the group is preferably one not sensitive to reduction. After the A-ring has been reduced, the substituents on said A-ring may be the same as those originally present, or substituents to which they may be converted, such as ketonic oxygen, dialkoxy, alkylenedioxy, alkylenethioxy, and alkylenedithio; or groups introducible by known processes, such as halogen or alkyl. For the processes of the invention and except for the limitations expressed in this specification, variations of the substituents on the A-ring of the fully formed tetracyclic structures, or on the intermediates leading thereto, are full equivalents of each other.

The carbon atom to which the phenyl group of the starting propanol (I) is attached can be substituted, as, for example, with an alkyl group, such as methyl or ethyl. Moreover, this atom, to which the phenyl group is attached in Compound I, need not necessarily be carbon. It can be a hetero atom which would not interfere with subsequent catalytic reductions, as, for example, oxygen or nitrogen. This 6-position, and it will be apparent, may be, as in the case of the nitrogen, substituted with hydrogen or an alkyl group.

The 1-position carbon atom of the starting phenylpropanol (I) can also be substituted, as, for example, with an alkyl group, such as methyl and ethyl, and, as such, be unchanged throughout the subsequent synthesis.

In the tetracyclic structures of the invention this carbon atom will appear in the 7-position.

For the processes of the invention and except for the limitations expressed in this specification, variations of the B-ring on the fully formed tetracyclic structures, or on the intermediate leading thereto, are full equivalents of each other.

In the Michael reaction step, the 3-keto substrate compound can be a 6-phenyl-1-hexen-3-one, or alternatively, a 6-phenyl-3-hexanone having attached to the 1-position a group which will eliminate with hydrogen to form a 6-phenyl-1-hexen-3-one under Michael conditions. Thus, a 3-keto compound with a 1-dialkylamino substituent or its quaternary salt, a 1-halo substituent, or a 1-hydroxy substituent will react with the nucleophilic compound to form the Michael product. The nucleophilic compound can be a carbocyclic-1,3-dione of varying ring size, as for example a five-membered ring, a six-membered ring, etc., ultimately forming a corresponding five-membered, a six-membered, etc., D-ring in the tetracyclic structure. The 1,3-cyclodione may also contain a hetero atom at positions other than position 2, thereby to provide a heterocyclic D-ring in the tetracyclic structure. Acylic nucleophilic compounds can be used in conducting the Michael reaction step and the open-chain of the resulting product thereafter ring-closed to form a cyclic D-ring.

For the processes of the invention, and except for the limitations expressed in this specification, variations of the D-ring on the fully formed tetracyclic structure, or on the intermediates leading thereto, are full equivalents of each other. By varying the group at the 2-position of the nucleophilic Michael condensation reactant, the invention provides a way to produce compounds resembling the 8-isomers of the natural steroids save at the 13-position. The starting materials for the preparation of the 2-substituted 1,3-cyclopentanediones are ketones of the structure R—$CH_2COCH_3$, where R is the substituent which will appear at the 2-position of the 1,3-cyclopentanediones. The starting ketone is reacted with diethyl oxalate in the presence of base to form a cyclopentane-1,3,4-trione-5-glyoxylic ester substituted at position 2 with the group R present in the starting ketone. The product is treated with acid to remove the 5-substituent, and the 4-ketone function is then removed by Wolff-Kishner reduction, involving selective semicarbazone formation at $C_4$ and heating the product with base such as sodium hydroxide. On acidification the required 2-substituted-1, 3-cyclopentane dione can be isolated. Thus, the group R, which eventually forms the 2-substituent of the 1,3-cyclopentane dione, can be any organic group which is stable to acid, and to Wolff-Kishner conditions and can be methyl, ethyl, propyl, cetyl, dimethylaminoethyl, etc. Thus, by varying the substituent at the 2-position of the 1,3 - cyclopentanedione, alkyl groups of varying chain length such as, for example, ethyl, isopropyl, cetyl, etc., may be introduced to form the 8-isogonane correspondingly substituted at the 13-position. Further 8-isogonanes may be prepared wherein the 13-position is substituted with any organic radical. Thus, but without limiting the generality of the foregoing, an aralkyl, cycloalkylalkyl, or a polycarbon-alkylene bridge bearing a hydroxy-, amino, or alkylamino-substituent can readily be placed in the 13-position, and from such compounds other variations of the 13-position substituent can be prepared, as haloalkyls from hydroxyalkyls, or quaternary salts, amides, alkenyls, etc. from aminoalkyls.

For the processes of the invention and except for the limitations expressed in this specification, variations at the 13-position of the fully formed tetracyclic structures or on the intermediates leading thereto are the fully equivalents of the claimed 13-position polycarbon-alkyl substituents, having physiological activity of the same type.

Figure 2:
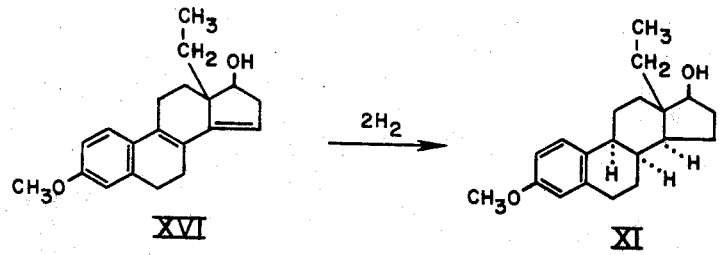
FIGURE 2 illustrates schematically the hydrogenation of a 13-alkylgona-1,3,5(10),8,14-pentaene to prepare a 13-alkyl-8-isogona-1,3,5(10)-triene, specifically the conversion of 13β-ethyl-3-methoxy-8-isogona-1,3,5(10),8,14-pentaen-17β-ol (XVI) to 13β-ethyl-3-methoxy-8-isogona-1,3,5(10)-triene-17β-ol (XI).

In any of the intermediate structures or in the tetracyclic structures of the invention having either an aromatic, partially reduced, or totally reduced A-ring wherein the 17-position, or position corresponding thereto in the 8-isogonane nucleus, is carbonyl, the carbonyl group can be converted to a group such as hydroxymethylene by lithium aluminum hydride reduction (e.g. FIGURE 2) to acyloxymethylene by esterification of the hydroxymethylene group so formed; to alkoxymethylene by etherification of the hydroxymethylene group; to alkylhydroxymethylene by addition of the appropriate organometallic reagent to the carbonyl; or to alkynylhydroxymethylene by addition of the appropriate alkali metal acetylide in a suitable inert solvent (e.g. FIGURE 4); all in the known manners. The carbonyl group may also be ketalized or thioketalized by treating with the appropriate alcohol or glycol in a suitable solvent under acidic conditions, as in the presence of an acid such as sulfuric acid, p-toluene sulfonic acid, or boron trifluoride etherate, with heating where necessary, according to the known art. Hydroxyl groups, where present, may be converted to corresponding ethers or esters by methods known to those skilled in the art. The esters formed may be those of organic acids such as acetic acid, and an inorganic acid such as phosphoric or sulphuric. Also in any of the same intermediate or tetracyclic structures, the functional groups already present may be exploited, by procedures standard in the art, for the introduction of substituent groups such as hydroxyl, alkyl, and halogen, into ring-A and at the 6-, 7- and 16-positions, or positions corresponding thereto in the gonane nucleus. Such substituted derivatives are the full equivalents of the claimed corresponding parent compounds and of each other.

The specific reactions involved in the processes of the invention will now be considered, as follows, reference being made to the drawings for typifying compounds:

The vinyl ketones (VI) of the invention are prepared by elimination of dialkylamine from the corresponding dialkylaminoethyl aminoketones (V), obtained by hydration of the acetylenic linkage in an acetylenic amine (IV). The acetylenic amines (IV) can be themselves prepared by a Mannich reaction from the corresponding acetylene (III) with formaldehyde and a dialkylamine. The hydration can be carried out, for example, in aqueous sulfuric acid with mercuric sulfate as a catalyst. The corresponding quaternary salts, which may also be used in the subsequent Michael condensation, can be obtained by quaternization of the corresponding acetylenic dialkylaminoethyl amine, followed by hydration, or by quaternization of the ketoamine. The vinyl ketones can be prepared from these derivatives by the above elimination reaction. Thus the ketoamine or its quaternary salt can be treated with a base for this purpose, for example, with sodium hydroxide or a sodium alkoxide.

The vinyl ketones (VI) and dialkylamino ketones (V) are condensed with a nucleophilic compound under Michael reaction conditions. Thus the condensation can be carried out by bringing the two reagents together in solution in the presence of a base, for example, pyridine, triethylamine, diethylamine, sodium hydroxide, or sodium methoxide, and heating as required. The nature and amount of base employed in the condensation reaction will depend upon the particular reagents used. Where the vinyl ketone derivative employed is a keto-amine and dialkylamine is eliminated in the reaction, no added base may be required. Where the compound is a 2-alkylcyclopentane-1,3-dione (VII), the compound to be condensed with it is preferably a vinyl ketone, and the dione is used in excess of the molecular equivalent quantity. Suitable solvents are hydrocarbons, such as benzene, and anhydrous alcohols, such as methanol. If the reaction is carried out in benzene under refluxing conditions, water formed in the condensation may be azeotroped out of the reaction mixture with a Dean-Stark type trap.

Figure 3:
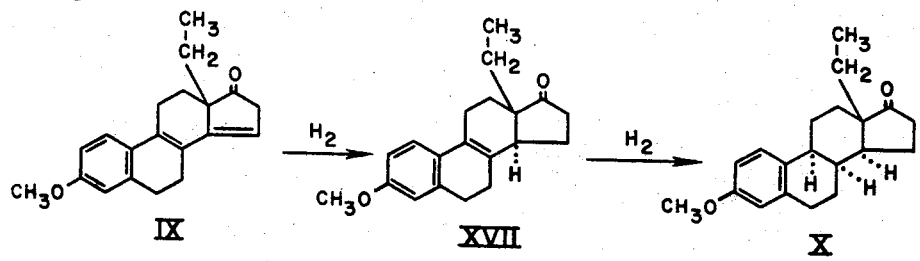
FIGURE 3 illustrates schematically the hydrogenation of a 13-alkylgona-1,3,5(10),8,14-pentaene in two stages i.e. via a 13-alkylgona-1,3,5(10),8-tetraene, specifically the conversion of 13β-ethyl-3-methoxygona-1,3,5(10),8,14-pentaen-17-one (IX) to 13β-ethyl-3-methoxy-8-isogona-1,3,5(10)-trien-17-one (X).

The double cyclodehydration is brought about by dissolving a compound typified by Compound VIII in benzene containing a catalytic amount of p-toluene sulfonic acid and boiling the mixture under a Dean-Stark trap until two equivalents of water have been collected, or alternatively, by treating the same triketone with polyphosphoric acid at room temperature or slightly above until ring closure is complete. Catalytic hydrogenation of the gona-1,3,5(10),8,14-pentaenes then gives a class of novel and useful 8-isomeric steroids. The starting pentaenes can have a 17-carbonyl (e.g. FIGURE 1) or be reduced to hydroxymethylene before hydrogenation (e.g. FIGURE 2). The catalytic hydrogenation can be carried out so that two molecular equivalents of hydrogen are absorbed, and the 8-isomeric product isolated directly (FIGURE 2), or the hydrogenation can be interrupted after one molecular equivalent of hydrogen has been absorbed and the intermediate gona-1,3,5(10),8-tetraene isolated and then further hydrogenated to an 8-isomeric steroid (FIGURE 3). Solvents such as benzene, anhydrous ethanol, and methanol are suitable, and the hydrogenation is preferably carried out at room temperature and pressure.

While the tetracyclic compounds in this specification and the appended examples are named to describe the configuration to that of the natural steroids, it is to be understood that unless otherwise indicated, the product of each of the given manipulative procedures is a racemic mixture which contains said named compound and its enantiomorph.

Representative formulations embodying specific compositions of the invention are as follows.

A capsule for use as an oral hypocholesterolenic agent contains:

| | Mg. |
|---|---|
| 13β - ethyl-3-methoxy-8-isogona-1,3,5(10)-trien-17β-ol | 20–100 |
| Magnesium stearate | 24 |
| Lactose, U.S.P. q.s. ad. | 480 |

A tablet for use as an oral hypocholesterolenic agent contains:

| | |
|---|---|
| 13β - ethyl-3-methoxy-8-isogona-1,3,5(10)-trien-17β-ol | 20–100 |
| Magnesium stearate | 0.65 |
| Talc, U.S.P. | 10.00 |
| Avicel (American Viscose Division, FMC corp). | 115.00 |
| Lactose, U.S.P. q.s. ad. | 260.00 |

A tablet for use as an agent for the control of postmenopausal syndrome contains:

| | |
|---|---|
| 13β - ethyl-3-methoxy-8-isogona-1,3,5(10)-trien-17β-ol | 5–40 |
| Magnesium stearate | 0.65 |
| Talc, U.S.P. | 10.00 |
| Avicel (American Viscose Division, FMC Corp.) | 115.00 |
| Lactose, U.S.P. q.s. ad. | 260.00 |

Pharmaceutically acceptable carriers can be either solid or liquid. Solid form preparations include powders, tablets, dispersible granules, capsules, cachets, and suppositories. A solid carrier can be one or more substances which may also act as diluents, flavoring agents, solubilizers, lubricants, suspending agents, binders, or tablet-disintegrating agents: it can also be an encapsulating material. In powders the carrier is a finely divided solid which is in admixture with the finely divided compound. In the tablets the compound is mixed with carrier having the necessary binding properties in suitable proportions and compacted in the shape and size desired. The powders and tablets, preferably contain from 5 to 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethylcellulose, a low melting wax, and cocoa butter. The term "preparation" is intended to include the formulation of the compound with encapsulating material as carrier providing a capsule in which the compound (with or without other carriers) is surrounded by carrier, which is surrounded by carrier, which is thus in association with it. Similarly, cachets are included. Tablets, powders, cachets, and capsules can be used for oral administration.

Liquid form preparations include solutions, suspensions, and emulsions. The compounds are insoluble in water, but can be dissolved in aqueous-organic solvent mixtures that are non-toxic in the amounts used. As an example may be mentioned water-propylene glycol solutions for parenteral injection. Liquid preparations can also be formulated in solution in aqueous polyethylene glycol solutions. Aqueous suspension suitable for oral use can be made by dispensing the finely divided compound in water with viscous material, natural or synthetic gums, resins, etc., for example, gum arabic, ion-exchange resins, methylcellulose, sodium carboxymethylcellulose and other well-known suspending agents.

Preferably the pharmaceutical preparation is in unit dosage form. In such form the preparation is sub-divided in unit doses containing appropriate quantities of the compound: the unit dosage form can be a packaged preparation, the package containing discrete quantities of preparation, for example, packeted powders of vials or ampules. The unit dosage form can be a capsule, cachet, or a tablet itself, or it can be the appropriate number of any of these in packaged form. The quantity of compound in a unit dose of preparation may be varied or adjusted from 1 mg. to 100 mg. (generally within the range of 2.5 to 25 mg.).

The claimed compositions having physiological activity can be incorporated into pharmaceutical formulations including sustained-release agents.

The following preparations illustrate the manner of making the chemical compounds which are the starting materials for use in the processes of the invention.

Preparation 1: 3 - (3 - methoxyphenyl)-n-propyl bromide.—Cool 3-(3-methoxyphenyl)propan-1-ol (125 g.) in benzene (200 cc.) to 0° and add a solution of phosphorus tribromide (86 g.) in benzene (150 cc.) dropwise so that the temperature of the mixture does not rise above 5°. Keep the mixture at 0° for 1 hr. and then heat at 60° for 3 hrs. Cool, pour onto ice, dilute with ether and separate the organic layer. Wash the organic solution with 3 N aqueous sodium hydroxide, water and dry. Remove the solvent and distill the residue to obtain the title compound (131 g.) B.P. 146–148°/17 mm. $n_D^{18}$ 1.5497.

$C_{10}H_{13}BrO$ calculated: C, 52.4; H, 5.7; Br, 34.8. Found: C, 54.4; H, 5.7; Br, 34.7.

Preparation 2: 5-m-methoxyphenylpent-1-yne.—Add 3-(3-methoxyphenyl)-n-propyl bromide (14 g.) in tetrahydrofuran (15 cc.) with rapid stirring to a solution of sodium acetylide (from 1.84 g. sodium) in liquid ammonia (125 cc.) in a Dewar flask. Continue stirring for 22 hours, then add ammonium chloride (3 g.) and water (50 cc.) Collect the product with ether and wash and dry the ethereal solution. Distill to obtain 5-m-methoxyphenylpent-1-yne (7.1 gr., 66%), B.P. 75–78° C./0.06 mm. Hg.

$C_{12}H_{14}O$ calculated: C, 82.7%; H, 8.1%. Found: C, 82.2%; H, 7.8%.

Preparation 3: 1-diethylamino-6-m-methoxyphenylhex-2-yne.—Allow 5-m-methoxyphenylpent-1-yne (8 g.) to stand for 12 hours at 70° C. under nitrogen with water (2.5 cc.), trioxan (0.5 g.), 30% formalin (5.5 g.), diethylamine (4 g.), acetic acid (2.75 g.), dioxan (25 cc.) and cuprous chloride (0.13 g.). Make the cooled solution alkaline with 10% aqueous sodium hydroxide and extract with ether; then extract the ether extract with 10% hydrochloric acid: wash the acid extract with ether, make alkaline with 10% aqueous sodium hydroxide, extract with ether, and then wash and dry the ether extract. Distill to obtain 1-diethylamino-6-m-methoxyphenylhex-2-yne (10.6 g., 88%), B.P. 130–131° C./0.1 mm.

$C_{17}H_{25}N$ calculated: C, 78.7%; H, 9.7%. Found: C, 78.9%; H, 9.6%.

Preparation 4: 1-diethylamino-6-m-methoxyphenylhexan-3-one and 6-m-methoxyphenylhex-1-en-3-one.—Add mercuric sulphate (0.45 g.) to a swirled solution of 1-diethylamino-6-m-methoxyphenylhex-2-yne (8.5 g.) in concentrated sulphuric acid (2.5 cc.) and water (25 cc.). Keep the solution under nitrogen at 75° C. for 1 hour, then cool, make basic with 10% aqueous sodium hydroxide, and filter through glass wool to remove mercuric oxide. Extract product with ether and wash and dry the ethereal solution. Remove the solvent to obtain the crude ketoamine 1-diethylamino-6-m-methoxyphenylhexan-3-one, infrared absorption peak at 1710 μ. Distill under reduced pressure with partial elimination of diethylamine, to obtain a mixture of the ketoamine 1-diethylamino-6-m-methoxyphenylhexan-3-one and the vinyl ketone 6-m-methoxyphenylhex-1-en-3-one (7.1 g., ca. 76%), B.P. 140–145° C./0.1 mm.; infrared absorption peaks at 5.85 and 5.95 μ, the ketoamine predominating.

Distill a second portion of the crude ketoamine 1-diethylamino-6-m-methoxyphenylhexan-3-one very slowly over a period of 30 minutes through a Vigreux fractionating column 10 cm. high and 1 in. diameter under reduced pressure to eliminate most of the diethylamine. Dissolve the 6-m-methoxyphenylhex-1-en-3-one obtained (B.P. 114° C./0.7 mm.) in ether and wash the ether solution with dilute hydrochloric acid, followed by aqueous sodium bicarbonate and water. Dry and evaporate. Distill the residue to give the pure vinyl ketone as a colorless liquid, B.P. 76° C./0.3 mm.

$C_{13}H_{16}O_2$ calculated: C, 76.4%; H, 7.9%. Found: C, 76.3%; H, 8.0%.

Mix a third portion of the crude undistilled 1-diethylamino-6-m-methoxyphenylhexan-3-one (3 g.) with methyl iodide (3 g.). An exothermic reaction soon develops. After 12 hours wash the mixture with ether to remove unchanged reactants and subject to reduced pressure (15 min.) to remove ether remaining: the residue is the crude methiodide of the ketoamine (4.6 g.).

Infrared absorption peaks at 5.85 μ.

This compound is useful for preparing the novel compositions of this invention which have hormonal activity.

Preparation 5: 2 - ethylcyclopentane-1,3-dione.—Dissolve 2-ethylcyclopentane-1,3,4-trione hydrate (30 g., M.P. 65–69°, Koenigs and Hopmann, Ber., 1921, 54, 1343) in ethanol (200 cc.) and water (100 cc.). To this solution add dropwise during 1 hour a solution of semicarbazide hydrochloride (21 g.) and sodium acetate (28.2 g.) in water (200 cc.) with vigorous stirring throughout. Filter off the semicarbazone precipitate, wash with methanol, and purify by stirring in refluxing methanol; filter to obtain a pale cream powder, M.P. 179–82°.

Dissolve the semicarbazone (34 g.) in a solution of potassium hydroxide (34 g.) in dry ethylene glycol at 130°, and heat the mixture to 160° for 1 hour, followed by 30 minutes at 180°. Distill the glycol at 0.01 mm., dissolve the residual solid in water (150 cc.) and make the solution acid to Congo Red with hydrochloric acid. Cool to 0° overnight and filter. Recrystallize the residue from water to obtain 2-ethylcyclopentane-1,3-dione (10 g.), M.P. 180° with sublimation.

This compound is useful for preparing the novel compositions of this invention which have hormonal activity.

Preparation 6: 2-(6-m-methoxyphenyl-3-oxohexyl)-2-ethylcyclopentane-1,3-dione.—Reflux a mixture (5.25 g.) of 1 - diethylamino-6-m-methoxyphenylhexan-3-one and 6-m-methoxyphenylhex-1-en-3-one with 2-ethylcyclopentane-1,3-dione (3.3 g.) in dry 0.12% methanolic solution of potassium hydroxide for 18 hours. Filter the resulting solution, evaporate to dryness and dissolve the residue in ether. Wash the ether solution with alkali, hydrochloric acid, and water, dry and evaporate to obtain as residue the triketone 2-(6-m-methoxyphenyl-3-oxohexyl)-2-ethylcyclopentane-1,3-dione (7.1 g.) as a gum.

This compound is useful as an intermediate for the preparation of the novel compositions of this invention which have hormonal activity.

Preparation 7: 13β-ethyl-3-methoxygona-1,3,5(10),8,14-pentaen-17-one.—Reflux the triketone 2-ethyl-2-(6-m- methoxyphenyl-3-oxohexyl)cyclopentane-1,3-dione (7.1 g.), in benzene (150 cc.) and toluene-p-sulphonic acid (2 g.) until the theoretical amount of water (0.72 cc.) for double cyclodehydration has been collected in a Dean-Stark separator. Wash the cooled reaction mixture after removal of solvent under reduced pressure, B.P. ca. 220°/ 0.01 mm., to obtain an almost colorless glass (5.7 g.). Crystallize the glass from methanol containing a little ethyl acetate to obtain pure 13β-ethyl-3-methoxygona-1,3,5(10),8,14-pentaen-17-one (3.7 g.), M.P. 77–80°; ultraviolet absorption peak at 311 mμ (ε 28,000).

$C_{20}H_{22}O_2$ calculated: C, 81.6%; H, 7.5%. Found: C, 81.3%; H, 7.3%.

This compound has estrogenic activity, lowers the blood lipid level, and is useful as an intermediate for preparing the hormonal compounds of this invention.

The following examples illustrate the manner of using the claimed processes of the invention for the preparation of the claimed compositions of the invention, and for the preparation of natural steroids.

Example 1.—13β-methyl-3-methoxy-8-iso-gona-1,3,5(10)-trien-17-one

Hydrogenate 13β - methyl - 3 - methoxy - gona-1,3,5(10),8,14 - pentaen - 17 - one (3 g.) dissolved in ethanol (150 cc.) at atmospheric pressure in the presence of a 4% palladium on barium sulphate catalyst (3 g.) until hydrogen uptake ceases. Filter the catalyst and evaporate the filtrate to obtain residue and crystallize from ethanol to obtain the title compound (1.1 g.).

This compound has estrogenic activity, lowers the lipid level, and is useful as an intermediate for preparing the hormonal compounds of this invention.

Example 2.—13β-methyl-3-methoxy-8-iso-gona-1,3,5(10)-trien-17-one

Dissolve 13β - methyl - 3 - methoxy - gona - 1,3, 5(10),8,14 - pentaen - 17 - one (1 g.) in benzene (35 cc.) and shake with hydrogen at atmospheric pressure in the presence of a 10% palladium on charcoal catalyst (0.5 g.) until hydrogen uptake ceases. Remove the catalyst, evaporate the solvent and recrystallize the residue from ethanol to obtain the title compound (0.55 g., 54%), M.P. 151–3°.

This compound has estragenic activity, lowers the lipid level, and is useful as an intermediate for preparing the hormonal compounds of this invention.

To obtain 13β - ethyl - 3 - methoxy - 8 - isogona-1,3,5(10) - trien - 17 - one, hydrogenate 13β - ethyl - 3-methoxygona - 1,3,5(10),8,14 - pentaene - 17 - one according to the manipulative procedure described above.

To obtain 13β - isopropyl - 3 - methoxy - 8 - isogona-1,3,5(10) - trien - 17 - one, hydrogenate 13β - isopropyl-3 - methoxygona - 1,3,5(10),8,14 - pentaen - 17 - one according to the manipulative procedure described above.

These compounds have estrogenic activity, lower the blood lipid level, and are useful as intermediates in the preparation of the hormonal compounds of this invention.

Example 3.—13β-ethyl-3-methoxy-8-isogona-1,3,5(10)-trien-17-one

Shake 13β - ethyl - 3 - methoxygona - 1,3,5(10),8-tetraen - 17 - one (0.1 g.) in methanol (20 cc.) with hydrogen at atmospheric pressure in the presence of a 10% palladium on charcoal catalyst (0.05 g.) until hydrogen uptake ceases. Remove the catalyst and evaporate the solvent to obtain a gum and crystallize from methanol to obtain the title compound, M.P. 93–6°.

This compound has estrogenic activity, lowers the lipid level, and is useful as an intermediate for preparing the hormonal compounds of this invention.

Example 4.—13β-ethyl-3-methoxy-17,17-ethylenedioxy-8-isogona-1,3,5(10)-triene

Shake 13β - ethyl - 3 - methoxy - 17,17 - ethylene- dioxy - gona 1,3,5(10),8,14 - pentaene (0.7 g.) in ethanol (50 cc.) with hydrogen at atmospheric pressure in the presence of a 10% palladium of charcoal catalyst until 2 molecular equivalents of hydrogen have been absorbed. Crystallize the residue obtained after removal of catalyst and solvent from a mixture of methanol (25 cc.) and ethanol (25 cc.) to obtain the title compound (0.35 g.), M.P. 131–3°.

$C_{22}H_{30}O_3$ calculated: C, 77.1%; H, 8.8%. Found: C, 77.2%; H, 8.8%.

This compound has estrogenic activity, lowers the blood lipid level, and is useful as an intermediate for preparing the hormonal compounds of this invention.

Example 5.—13β-ethyl-3-methoxy-8-isogona-1,3,5(10)-trien-17-one

Pass hydrogen chloride through a solution of 13β-ethyl - 3 - methoxy - 17,17 - ethylenedioxy - 8 - isogona-1,3,5(10) - triene (0.2 g.) in chloroform (5 cc.) at room temperature for 1 hour. Wash the product to remove hydrogen chloride, dry, and evaporate the solvent to obtain an oil and crystallize from ethanol to obtain the title compound (0.07 g.), M.P. 90–2°, undepressed on admixture with a sample otherwise obtained.

This compound has estrogenic activity, lowers the blood lipid level, and is useful as an intermediate for preparing the hormonal compounds of this invention.

Example 6.—13β-n-propyl-3-methoxy-8-isogona-1,3,5(10)-trien-17-one

Hydrogenate 13β - n - propyl - 3 - methoxygona - 1,3, 5(10),8,14 - pentaen - 17 - one (5 g.) in ethanol (500 cc.) over 10% palladized charcoal (2 g.) until two molar equivalents of hydrogen have been absorbed. Filter the catalyst, evaporate the solvent and recrystallize the residue from ethanol to obtain the title compound (2.8 g.), M.P. 133–134°; ultraviolet absorption peak at 280 mμ (ε 2,300) 287 mμ (ε 2,300); infrared absorption peak at 5.76 μ.

This compound has estrogenic activity, lowers the blood lipid level, and is useful as an intermediate for preparing the hormonal compounds of this invention.

Example 7.—13β-isobutyl-3-methoxy-8-isogona-1,3,5(10)-trien-17-one

Hydrogenate 13β - isobutyl - 3 - methoxygona - 1,3, 5(10),8,14 - pentaen - 17 - one (5 g.) in ethanol (400 cc.) over a 10% palladized charcoal catalyst (5 g. until two molar equivalents of hydrogen have been absorbed. Filter the catalyst and evaporate the solvent to obtain a residue, and recrystallize from ethanol-water (19:1) to obtain the title compound (1.25 g.), M.P. 142°; ultraviolet absorption peak at 280 mμ (ε 2,200), 288 mμ (ε 2,150); infrared absorption peak at 5.77 μ.

$C_{22}H_{30}O_2$ calculated: C, 80.9%; H, 9.2%. Found: C, 80.9%; H, 9.2%.

To obtain 13β - n - butyl - 3 - methoxy - 8 - isogona-1,3,5(10) - trien - 17 - one, hydrogenate 13β - n - butyl-3 - methoxygona - 1,3,5(10),8,14 - pentaen - 17 - one according to the manipulative procedure described above.

To obtain 13β,6 - dimethyl - 3 - methoxy - 8 - isogona-1,3,5(10) - trien - 17 - one, hydrogenate 13β,6-dimethyl-3 - methoxygona - 1,3,5(10),8,14 - pentaen - 17 - one according to the manipulative procedure described above.

To obtain 13β,7 - dimethyl - 3 - methoxy - 8 - isogona-1,3,5(10) - trien - 17 - one, hydrogenate 13β,7 - dimethyl-3 - methoxygona - 1,3,5(10),8,14 - pentaen - 17 - one according to the manipulative procedures described above.

To obtain 13β - n - propyl - 3 - hydroxy - 8 - isogona - 1,3,5(10) - trien - 17 - one, hydrogenate 13β-n - propyl - 3 - hydroxygona - 1,3,5(10),8,14 - pentaen-17 - one according to the manipulative procedure described above.

To obtain 13β - n - butyl - 3 - hydroxy - 8 - isogona-1,3,5(10) - trien - 17 - one, hydrogenate 13β - n - butyl- 3 - hydroxygona - 1,3,5(10),8,14 - pentaen - 17 - one according to the manipulative procedure described above.

To obtain 13β - ethyl - 2,3 - dimethoxy - 8 - isogona-1,3,5(10) - trien - 17 - one, hydrogenate 13β - ethyl-2,3 - dimethoxygona - 1,3,5(10),8,14 - pentaen - 17-one according to the manipulative procedure described above.

To obtain 13β - ethyl - 1,3-dimethoxy - 8-isogona-1,3,5(10)-trien-17-one, hydrogenate 13β-ethyl-1,3-dimethoxygona-1,3,5(10),8,14-pentaen-17-one according to the manipulative procedure described above.

To obtain 13β-(3-hydroxypropyl)-3-methoxy-8-isogona-1,3,5(10)-trien-17-one, hydrogenate 13β-(3-hydroxypropyl)-3-methoxygona-1,3,5(10),8,14-pentaen-17 - one according to the manipulative procedure described above.

To obtain 13β - isobutyl - 3 - pentyloxy-8-isogona-1,3,5(10)-trien-17-one, hydrogenate 13β-isobutyl-3-pentyloxy-gona-1,3,5(10),8,14-pentaen-17-one according to the manipulative procedure described above.

To obtain 13β-(3-hydroxypropyl)-3-cyclopentyloxy-8-isogona-1,3,5(10)-trien-17-one, hydrogenate 13β-(3-hydroxypropyl)-3-cyclopentyloxygona-1,3,5(10),8,14 - pentaen-17-one according to the manipulative procedure described above.

To obtain 13β - phenethyl - 3 - hydroxy-8-isogona-1,3,5(10)-trien-17-one, hydrogenate 13β-phenethyl-3-hydroxygona-1,3,5(10),8,14-pentaen - 17 - one according to the manipulative procedure describe above.

To obtain 13β-(2-diethylaminoethyl)-2,3-dimethoxy-8-isogona-1,3,5(10)-trien-17-one, hydrogenate 13β-(2-diethylaminoethyl)-2,3 - dimethoxygona - 1,3,5(10),8,14-pentaen-17-one according to the manipulative procedure described above.

To obtain 13β-(3-dimethylaminopropyl)-6-methyl-1,3-dimethoxy-8-isogona-1,3,5(10)-trien-17-one, hydrogenate 13β-(3-dimethylaminopropyl)-6-methyl - 1,3 - dimethoxygona-1,3,5(10),8,14-pentaen-17-one according to the manipulative procedure described above.

To obtain 13β-n-butyl-1,3-diethoxy-6-ethyl-8-isogona-1,3,5(10)-trien-17-one, hydrogenate 13β-n-butyl-1,3-diethoxy-6-ethylgona-1,3,5(10),8,14-pentaen - 17 - one according to the manipulative procedure described above.

To obtain 13β-n-propyl-2-ethoxy-3-methoxy-8-isogona-1,3,5(10)-trien-17-one, hydrogenate 13β-n-propyl-2-ethoxy-2-ethoxy-3-methoxygona-1,3,5(10),8,14-pentaen - 17-one according to the manipulative procedure described above.

These compounds have estrogenic activity, lower the blood lipid level, and are useful as intermediates in the preparation of the hormonal compounds of this invention.

Example 8.—13β-cetyl-3-methoxy-8-isogona-1,3,5(10)-trien-17-one

Shake 13β - cetyl - 3-methoxygona-1,3,5(10),8,14-pentaen-3-one (1.9 g.) in ethanol (250 cc.) with hydrogen at atmospheric pressure in the presence of a 10% palladium on charcoal catalyst (1 g.) until uptake of hydrogen ceases. Remove the catalyst and evaporate to obtain a colorless oil, and distill at 245–55° (bath temperature) 0.0002 mm., to obtain the title compound; ultraviolet absorption peak at 280 mμ (ε 1,560).

$C_{34}H_{54}O_2$ calculated: C, 82.5%; H, 11.0%. Found: C, 82.4%; H, 10.7%.

This compound has estrogenic activity, lowers the blood lipid level, and is useful as an intermediate for preparing the hormonal compounds of this invention.

Example 9.—13β-methyl-3-hydroxy-8-isogona-1,3,(10)-trien-17-one

Hydrogenate 13β - methyl-3-hydroxygona-1,3,5(10),8,14-pentaen-17-one (0.16 g.) in ethanol (20 cc.) at atmospheric pressure in the presence of a 30% palladized charcoal catalyst (0.075 g.). When 2.2 molar equivalents of hydrogen have been absorbed, (4 hours), filter the catalyst and evaporate the filtrate. Recrystallize the residue from methanol to obtain the title compound as colorless plates, M.P. 246–9° with sublimation; ultraviolet absorption peak at 281 mμ (ε 2,150).

This compound has estrogenic activity, lower the blood lipid level, and is useful as an intermediate for preparing the hormonal compounds of this invention.

Example 10.—13β-methyl-3-hydroxy-8-isogona-1,3,5(10)-trien-17-one

Hydrogenate 13β - methyl-3-hydroxygona-1,3,5(10),8,14-pentaen-17-one (0.14 g.) in a mixture of benzene (37.5 cc.) and tetrahydrofuran (12.5 cc.) at atmospheric pressure using a 10% palladium on charcoal catalyst (0.075 g.) until hydrogen uptake is complete (6 hours). Remove the catalyst and the solvent to obtain a residue and crystallize from methanol to obtain the title compound, M.P. 246–7.5°; ultraviolet absorption peak at 281 mμ (ε 1,900), confirming complete hydrogenation of the ethylenic bonds.

This compound has estrogenic activity, lowers the blood lipid level, and is useful as an intermediate for preparing the hormonal compounds of this invention.

Example 11.—13β-methyl-3-hydroxy-8-isogona-1,3,5(10)-trien-17-one

Hydrogenate 13β - methyl - 3-acetoxygonal-1,3,(10),8,14-pentaen-17-one (0.38 g., obtained by the acetylation of bisdehydroestrone with pyridine and acetic anhydride) in ethanol (20 cc.) at atmospheric pressure with a 10% palladium on charcoal catalyst (0.02 g.) until hydrogenation ceases. Filter the catalyst and evaporate the solvent to obtain colorless crystals of 13β-methyl-3-acetoxy-8-isogona-1,3,5(10)-trien-17-one. Take up the product in methanol (3 cc.), and add 3 N sodium hydroxide solution (1 cc.). After 15 minutes, acidify the solution and filter the precipitate obtained, and recrystallize from methanol to obtain the title compound, M.P. 253–5° with previous sublimation and softening at 247°; ultraviolet absorption peak at 281 mμ (ε 2,200).

This compound has estrogenic activity, lowers the blood lipid level, and is useful as an intermediate for preparing the hormonal compounds of this invention.

Example 12.—13β-ethyl-3-hydroxy-8-isogona-1,3,5(10)-trien-17-one

Fuse 13β-ethyl-3-methoxy-8-isogona - 1,3,5(10)-trien-17-one (0.5 g.) with pyridine hydrochloride (5 g.) at 218° for 40 minutes. Dissolve the cooled melt in methanol (25 cc.), pour into water, and extract thoroughly with ether. Dissolve the gummy product in benzene (5 cc.) and absorb on a column of ion exchange resin (prepared by mixing a synthetic hydrated acid magnesium silicate and celite resin in the proportion 4:1 by weight, and then washing with hydrochloric acid and water and drying at 100°). Elute the absorbed material with benzene to remove a by-product, and subsequently elute with ether to obtain the title compound (0.22 g.), M.P. 170–82° after recrystallization from methanol; infrared absorption peak at 3.01, 5.84μ.

This compound has estrogenic activity, lowers the blood lipid level, and is useful as an intermediate for preparing the hormonal compounds of this invention.

Example 13.—13β-ethyl-3-hydroxy-8-isogona-1,3,5(10)-trien-17-one

Hydrogenate 13β-ethyl-3-hydroxygona-1,3,5(10),8,14-pentaen-17-one (0.4 g.) in ethanol (25 cc.) at atmospheric pressure using a 10% palladized charcoal catalyst (0.2 g.) until 2.2 molar equivalents of hydrogen are taken up (3 hours); filter and evaporate to obtain a crude product and recrystallize from methanol to obtain colorless crystals of the title compound (0.215 g.), M.P. 189–193° C. with sublimation to needles, M.P. 205–206° C. Further recrystallization of the material of M.P. 189–193° C. raises its melting point to 191–193° C.; ultraviolet absorption peak at 280.5 mμ (ε2,280).

$C_{19}H_{24}O_2$ Calculated: C, 80.25%; H, 8.5%. Found: C, 80.2%; H, 8.4%.

This compound has estrogenic and blood lipid lowering activity and is useful as an intermediate for preparing the hormonal compounds of this invention.

Example 14.—13β-methyl-3-methoxy-8-isogona-1,3,5-(10)-trien-17β-ol

Shake 13β-methyl-3-methoxygona-1,3,5(10),8,14-pentaen-17β-ol (2.3 g.) in ethanol (100 cc.) with hydrogen at atmospheric pressure in the presence of a 10% palladium on charcoal catalyst (1.2 g.). Remove the catalyst and solvent and crystallize the residue from methanol and then from a mixture of benzene and light petroleum to obtain the title compound, M.P. 103–104° C. on admixture with authentic material obtained by another route, M.P. 101–102° C.

This compound has estrogenic and blood lipid lowering activity and is useful as an intermediate for preparing the hormonal compounds of this invention.

Example 15.—13β-ethyl-3-methoxy-8-isogona-1,3,5(10)-trien-17β-ol

Shake 13β-ethyl-3-methoxygona-1,3,5(10),8,14-pentaen-17β-ol (3.4 g.) in ethanol (150 cc.) with hydrogen at atmospheric pressure in the presence of a 10% palladium on charcoal catalyst (3.4 g.). Remove the catalyts and solvent and crystallize the product from a mixture of ether and light petroleum to obtain the title product, M.P. 130–131° C.

$C_{20}H_{28}O_2$ Calculated: C, 79.9%; H, 9.4%. Found: C, 79.9%; H, 9.2%.

This compound has estrogenic and blood lipid lowering activity and is useful as an intermediate for preparing the hormonal compounds of this invention.

Example 16.—13β-n-propyl-3-methoxy-8-isogona-1,3,5-(10)-trien-17β-ol

Add sodium borohydride (2 g.) to 13β-n-propyl-3-methoxy-8-isogonal-1,3,5(10)-trien-17-one (3 g.) in ethanol (100 cc.), and reflux the mixture for one hour. On cooling, work up the product in the usual manner and recrystallize from ethanol-water (9:1) to obtain the title compound (2.1 g.) M.P. 116–190 C. The analytical sample obtained by a further recrystallization from ether-hexane has M.P. 120–121° C.; infrared absorption peak at 2.89µ; no absorption in 5.71–5.88µ region.

$C_{21}H_{30}O_2$ Calculated: C, 80.2%; H, 9.6%. Found: C, 80.3%; H, 9.6%.

This compound has estrogenic and blood lipid lowering activity and is useful as an intermediate for preparing the hormonal compounds of this invention.

Example 17.—13β-isopropyl-3-methoxy-8-isogona-1,3,5-(10)-trien-17β-ol

Add 13β-isopropyl-3-methoxy-8-isogona-1,3,5(10)-trien-17β-one (1 g.) to sodium borohydride (0.5 g.) in methanol (100 cc.). Stir the mixture for 1 hour at 50° (bath temperature), and on cooling acidify with aqueous acetic acid and pour into brine. Extract the product with ether and work up in the usual manner to obtain a crystalline residue. Recrystallize from methanol and then from acetonitrile-water to obtain the title product (500 mg.), M.P. (after drying for 5 hours over phosphorus pentoxide at 0.05 mm.) 64–69°.

Infrared absorption peaks at 2.96, 6.21, 7.97µ; no absorption in 5.71–5.88µ region.

This compound has estrogenic activity, lowers the lipid level, and is useful as an intermediate for preparing the hormonal compounds of this invention.

Example 18.—13β-isobutyl-3-methoxy-8-isogona-1,3,5(10)-trien-17β-ol

Add sodium borohydride (7 g.) to 13β-isobutyl-3-methoxy-8-isogona-1,3,5(10)-trien-17-one (2 g.) in ethanol (80 cc.) and reflux the mixture for 1 hour. On cooling, acidify the mixture with aqueous acetic acid and evaporate to dryness under reduced pressure. Add water and collect the product with ether. Recrystallize from methanol and then from ether-hexane to obtain the title product (2 g.), M.P. 137°; ultraviolet absorption peaks at 280 mµ (ε2,000), 287 mµ (ε1,900); infrared absorption peak at 2.88µ; no absorption in 5.71–5.88µ region.

$C_{22}H_{32}O_2$ Calculated: C, 80.4%; H, 9.8%. Found: C, 80.4%; H, 9.7%.

This compound has estrogenic and blood lipid lowering activity, and is useful as an intermediate for preparing the hormonal compounds of this invention.

Example 19.—13β-ethyl-8-isogona-1,3,5(10)-trien-3,17β-diol

Keep 13β-ethyl-3-hydroxy-8-isogona-1,3,5(10)-trien-17-one (1.04 g.) for 3 hours at room temperature in methanol (50 cc.) containing sodium borohydride (1 g.). Acidify the mixture with acetic acid and concentrate to a thick slurry. Add water and collect the product with ether. Work up in the usual manner to obtain residue and twice recrystallize from methanol to obtain the title product (64 g.) M.P. 189.5–192.5°; ultraviolet peak at 280 mµ (ε2,000); infrared absorption peaks at 2.99, 3.08µ.

$C_{19}H_{26}O_2$ Calculated: C, 79.7%; H, 9.15%. Found: C, 79.4%; H, 9.30%.

This compound has estrogenic and blood lipid lowering activity, and is useful as an intermediate for preparing the hormonal compounds of this invention.

Example 20.—13β-methyl-3,17β-dimethoxy-8-isogona-1,3,5(10)-triene

Add 13β-methyl-3-methoxy-8-isogona-1,3,5(10)-trien-17β-ol (75 g.) in methylene chloride (50 cc.) containing 1 drop of boron trifluoride etherate to diazomethane (from N-nitrosomethylurea, 2.05 g.) in methylene chloride (40 cc.). Work up and recrystallize the product from ethyl acetate-hexane and then from methanol to obtain the title compound (3 g.), M.P. 106–108°.

$C_{20}H_{28}O_2$ Calculated: C, 80.0%; H, 9.4%. Found: C, 79.8%; H, 9.3%.

This compound has estrogenic and blood lipid lowering activity and is useful as an intermediate for preparing the hormonal compounds of this invention.

Example 21.—13β-ethyl-3,17β-dimethoxy-8-isogona-1,3,5(10)-triene

Add 13β-ethyl-3-methoxy-8-isogona-1,3,5(10)-trien-17β-ol in methylene chloride (25 cc.) to diazomethane as previously described. Crystallize the product from hexane, dissolve in hexane-benzene (4:1) and chromatograph on neutral alumina. Elute with benzene; crystallize from n-hexane to obtain the title compound, M.P. 113°; ultraviolet absorption peaks at 279 mµ (ε2,200), 288 mµ (ε2,100).

$C_{21}H_{30}O_2$ Calculated: C, 80.2%; H, 9.1%. Found: C, 80.1%; H, 8.9%.

This compound has estrogenic and blood lipid lowering activity, and is useful as an intermediate for preparing the hormonal compounds of this invention.

Example 22.—13β-n-propyl-3,17β-dimethoxy-8-isogona-1,3,5(10)-triene

Add excess diazomethane in ether (60 cc.) to 13β-propyl-3-methoxy-8-isogona-1,3,5(10)-trien-17β-ol (1 g.) in methylene chloride (50 cc.) containing 1 drop of boron trifluoride etherate. Filter the solution, wash with aqueous sodium hydroxide and then with water, and dry. Remove the solvent and chromatograph the residue in hexane-benzene (9:1) through a column of neutral alumina (50 g.). Crystallize from ethanol, then from hexane, to obtain the title compound (0.35 g.), M.P. 92.5–93.5°; no infrared absorption in the 2.86–3.33µ region.

$C_{22}H_{32}O_2$ Calculated: C, 80.4%; H, 9.8%. Found: C, 80.5%; H, 10.1%.

This compound has estrogenic and blood lipid lowering activity, and is useful as an intermediate for preparing the hormonal compounds of this invention.

Example 23.—13β-ethyl-3-methoxy-17β-acetoxy-8-isogona-1,3,5(10)-triene

Dissolve 13β - ethyl - 3 - methoxy - 8 - isogona-1,3,5(10)-trien-17β-ol (1 g.) in pyridine (5 cc.) and acetic anhydride (5 cc.) and allow the mixture to stand at room temperature for 18 hours. Remove the solvent in vacuo and crystallize the residue to obtain the title compound; ultraviolet absorption peak at 286 mμ (ε2,000).

This compound has estrogenic and blood lipid lowering activity, and is useful as an intermediate for preparing the hormonal compounds of this invention.

Example 24.—13β-n-propyl-3-methoxy-17β-acetoxy-8-isogona-1,3,5(10)-triene

Prepare the starting material, 13β-propyl-3-methoxy-8-iosgona-1,3,5(10)-trien-17β-ol, by shaking 13β-propyl-3-methoxygona-1,3,5(10),8,14-pentaen-17-one (5 g.) in ethanol (100 cc.) containing 10% palladized charcoal (2 g.) until hydrogen uptake ceases. Obtain the product by filtration of the catalyst, evaporation of the solvent and crystallization from ethanol; then reflux with ethonal (100 cc.) and sodium borohydride (0.2 g.) for 30 minutes. Acidify the reaction mixture with acetic acid, evaporate almost to dryness, and water, and collect the product in ether. Wash, dry, and evaporate the ethereal solution and crystallize the residue from methanol. Dissolve this product (1 g.) in pyridine (5 cc.) and acetic anhydride (5 cc.) and allow to stand at room temperature for 18 hours. Remove the solvents and obtain the title compound by crystallizing from methanol; ultraviolet absorption peak at 286 mμ (ε1,900; 1,700).

This compound has estrogenic and blood lipid lowering activity, and is useful as an intermediate for preparing the hormonal compounds of this invention.

Example 25.—13β-n-propyl-3-methoxy-17β-benzoyloxy-8-isogona-1,3,5(10)-triene

Prepare 13β-propyl - 3 - methoxy-8-isogona-1,3,5(10)-trien-17β-ol (1 g.) as described in the previous example. Treat with benzoyl chloride (1.5 cc.) in pyridine (10 cc.) and keep at room temperature for 18 hours. Add water, and take the product up in ether. Wash the ethereal solution with water, 10% aqueous potassium hydroxide, water, 10% hydrochloric acid, and dry with brine. Evaporate the solvent and crystallize from ethanol to obtain the title compound; ultraviolet absorption peak at 286 mμ (ε 1,900).

This compound has estrogenic and blood lipid lowering activity, and is useful as an intermediate for preparing the hormonal compounds of this invention.

To obtain 13β-thyl-3-methoxy-17β-benzoyloxy-8-isogona 1,3,5(10)-triene, treat 13β-ethyl-3-methoxy-8-isogona-1,3,5(10)-trien-17β-ol with benzoyl chloride in pridine according to the manipulative procedure described above.

This compound has estrogenic activity, lowers the blood lipid level, and is useful as an intermediate in the preparation of the hormonal compounds of this invention.

Example 26.—13β-methyl-3-methoxy-17,17-propylenedioxy-8-isogona-1,3,5(10)-triene Shake 13β-methyl - 3 - methoxy-17,17-propylenedioxy-gona-1,3,5(10), 8,14-pentaene (1 g.) in ethanol (45 cc.) with 10% palladized charcoal (0.4 g.) in an atmosphere of hydrogen until uptake ceases (ca. 25 cc.). Remove solvent by filtration, evaporate the solvent under reduced pressure, and crystallize the residue from methanol to obtain the title compound; ultraviolet absorption peaks at 278, 286 mμ (ε3,000; 1,800).

This compound has estrogenic and blood lipid lowering activity, and is useful as an intermediate for preparing the hormonal compounds of this invention.

Example 27.—13β-ethyl-3-methoxy-17,17-(2,2-dimethylpropylene-dioxy)-8-isogona-1,3,5(10) triene Shake 13β-ethyl-3-methoxy-17,17-(2,2 - dimethylpropylenedioxy)-gona-1,3,5(10),8,14-pentaene (1 g.) in ethanol (75 cc.) containing 10% palladized charcoal (1 g.) in an atmosphere of hydrogen until uptake ceases. Remove the catalyst by filtration and evaporate. Crystallize the residue from ethanol to obtain the title compound, M.P. 173-8°; ultraviolet absorption peaks at 280, 287 mμ (ε2,500; 2,200).

$C_{25}H_{36}O_3$ Calculated: C, 78.1%; H, 9.4%. Found: C, 77.8%; H, 9.2%.

This compound has estrogenic activity, and is useful as an intermediate for preparing the hormonal compounds of this invention.

Example 28.—13β-ethyl-3-methoxy-17,17-diethoxy-8-isogona-1,3,5(10)-triene

Treat 13β-ethyl-3-methoxy-8-isogona-1,3,5(10) - trien-17-one (1 g.) in ethanol (4 cc.) and ethyl orthoformate (1 cc.) with 1 drop of sulfuric acid, and heat for 30 minutes at 40°. Add ethyl orthoformate (0.5 cc.) and heat at 55° for a further 30 minutes. Cool the solution and tip it into a saturated sodium bicarbonate solution, and take the product up in ether. Wash, dry, and evaporate the ethereal solution. Filter the residue in hexane-benzene (4:1) through alumina (50 g.). Evaporate the solvent to obtain the title compound; ultraviolet absorption peaks at 278, 286 mμ (ε2,000, 1,800).

This compound has estrogenic and blood lipid lowering activity, and is useful as an intermediate for preparing the hormonal compounds of this invention.

To obtain 13β-n-propyl-3-methoxy-17,17-diethoxy-8-isogona-1,3,5(10)-triene, treat 13β-n-propyl-3-methoxy-8-isogona-1,3,5(10)-trien-17-one with ethanol, ethyl orthoformate, and sulfuric acid according to the manipulative procedure described above.

This compound has an estrogenic and blood lipid lowering activity, and is useful as an intermediate in the preparation of the hormonal compounds of this invention.

Example 29.—13β-ethyl-3-methoxy-8-isogona-2,5(10)-dien-17β-ol

Dissolve 13β-ethyl-3-methoxy-8-isogona-1,3,5(10)-trien-17β-ol (1 g.) in 1-methoxy-2-propanol (100 cc.) and ammonia (200 cc.). Add lithium (1 g.) over 20 minutes, stir for 2 hours and allow the ammonia to evaporate. Add water (500 cc.), extract the reaction mixture with benzene and wash the organic solution with water and dry ($MgSO_4$). Evaporate the solvent and crystallize the residue from methanol-ethanol to obtain the title product (800 mg.) M.P. 105–9° Recrystallize a sample from benzene-petroleum ether to obtain the pure compound M.P. 112.5–113°. Infrared spectra: 2.87, 5.8, 6.0μ. Found: C, 79.35; H, 9.75 $C_{20}H_{30}O_2$ requires: C, 79.42; H, 9.99.

This compound is useful as an intermediate for preparing the hormonal compounds of this invention.

Example 30.—13β-ethyl-17β hydroxy-8-isogona 5(10)-en-3-one

Dissolve 13β-ethyl-3-methoxy - 8 - isogona-2,5(10)-dien-17β-ol (1 g) in ethanol (75 cc.). Add a solution of oxalic acid (1.15 g.) in water (21 cc.) and allow to stand for 45 minutes. Dilute the reaction mixture with water and extract with ether. Wash the ethereal solution with aqueous sodium hydrogen carbonate, brine and dry and evaporate to obtain the title compound as a gum (0.9 g.).

Infrared spectrum: 2.95, 5.85μ. Found: C, 79.12; H, 9.8; $C_{19}H_{28}O_2$ requires: C, 79.12; H, 9.78.

This compound has progestational activity and is useful as an intermediate for preparing the hormonal compounds of this invention.

Example 31.—13β-ethyl-17β-hydroxy-8-isogon-5(10)-en-3-one and 13β-ethyl-17β-hydroxy-8-isogon-4-en-3-one Dissolve 13β - ethyl-3-methoxy-8-isogona-2,5(10)-dien-17β-ol (0.5 g.) in ethanol (25 cc.) and methanol (25 cc.). Add 3 N hydrochloric acid (30 cc.) and allow the mixture to stand for 16 hours. Dilute with water, extract with ether and wash the organic solution with aqueous sodium hydrogen carbonate and brine. Dry the solution and evaporate to obtain a mixture of the title products as a gum (0.4 g.). Infrared absorption 2.95, 5.8, 6.05μ.

This mixture is useful as an intermediate for preparing the hormonal compounds of this invention.

Example 32.—13β-ethyl-3-methoxy-8-isogona-2,5(10)-dien-17-one

Dissolve 13β - ethyl - 3 - methoxy-8-isogona-2,5(10)-dien-17β-ol (1 g.) in cyclohexanone (10 cc.) and toluene (30 cc.). Add under an atmosphere of nitrogen a solution of toluene (20 cc.) and aluminium isopropoxide (0.2 g.) and reflux for 1 hour. Treat with water (20 cc.) and extract with ether. Wash the organic solution with water, dry and evaporate to obtain the title product (1 g.) as a solid; infrared spectrum 5.78, 5.9, 6.0μ.

This compound is useful as an intermediate for preparing the hormonal compounds of this invention.

Example 33.—13β-ethyl-17α-ethynyl-17β-hydroxy-8-isogon-5(10)-en-3-one

Treat a solution of 13β-ethyl-17α-ethynyl-3-methoxy-8-isogona-2,5(10)-dien-17β-ol in alcohol (75 cc.) with oxalic acid (1.15 g.) in water (21 cc.) and allowed to stand at room temperature for 45 minutes. Add water, extract with ether and wash, dry and evaporate the organic solution. Chromatograph the product on neutral alumina and elute the product with benzene-petroleum ether to obtain the title compound, M.P. 145–155°.

Infrared absorption 2.98, 3.12, 5.85μ. Found: C, 80.66; H, 9.02; $C_2H_{28}O_2$ requires: C, 80.73; H, 9.03%.

This compound has estrogenic activity and is useful as an intermediate for preparing the hormonal compounds of this invention.

Example 34.—2,3-dimethoxy-13β-methyl-8-isogona-1,3,5(10)-trien-17-one

Dissolve 2,3-dimethoxy - 13β - methylgona-1,3,5(10),8,14-pentaen-17-one (2.0 g.) in ethanol (250 ml.) and add to 10% palladized charcoal (400 mg.) in ethanol (ca. 10 ml.). Shake the mixture until uptake of hydrogen ceases, when 75% of the theoretical amount will be absorbed. Filter off the catalyst. Recrystallize the residue from methanol to obtain the title compound (1.1 g.), M.P. 162–168°; ultraviolet absorption peaks (ethanol) at 282 mμ and 287 mμ (ε=4,000); infrared maximum at 5.75μ. Recrystallize from acetone to obtain an analytical sample with M.P. 171–173°. (Found: C, 76.44; H, 8.29; $C_{20}H_{26}O_3$ requires: C, 76.40; H, 8.34%.)

This compound has estrogenic activity, lowers the blood lipid level, and is useful as an intermediate for preparing the hormonal compounds of this invention.

Example 35.—13β-isopentyl-3-methoxy-8-isogona-1,3,5(10)-trien-17-one

Condense 6-methylheptan-2-one with diethyl oxalate in the presence of sodium ethoxide, and convert the glyoxalate obtained by heating it with hydrochloric acid to 2-isopentylcyclopentane-1,3,5-trione, from which prepare the semicarbazone using semicarbazide hydrochloride and sodium acetate. Heat the semicarbazone with potassium hydroxide in ethylene glycol to obtain 2-isopentylcyclopentane-1,3-dione. Heat this dione (26.1 g.) with 6-(m-methoxyphenyl)-1-hexen-3-one (28.3 g.) in 0.12% methanolic potassium hydroxide (100 cc.) for 5 hours. Cool, evaporate the solvent and dissolve the residue in ether. Wash the ether solution with aqueous sodium hydroxide, hydrochloric acid, water and dry. Evaporate the solution and treat the residue with benzene (600 ml.) and toluene-p-sulfonic acid (8 g.) and reflux with continuous removal of water. Wash the cooled solution with water and evaporate to dryness. Distil the residue twice to obtain 13β-isopentyl - 3-methoxygona - 1,3,5(10),8,14 - pentaene-17-one (15.8 g). Hydrogenate this product (7.5 g.) in ethanol with 10% palladized charcoal until hydrogen uptake ceases. Filter the catalyst and evaporate the solvent to obtain the title compound (6.0 g.).

This compound has estrogenic activity, lowers the blood lipid level, and is useful as an intermediate for preparing the hormonal compounds of this invention.

Example 36.—13β-isopentyl-3-methoxy-8-isogona-1,3,5(10)-trien-17β-ol

Reflux 13β-isopentyl - 3 - methoxy-8-isogona-1,3,5(10)-trien-17-one (5.9 g.) with sodium borohydride (0.6 g.) in absolute ethanol and work up to obtain the title compound (1.3 g.) as a hemiethanolate (from ethanol), M.P. 60–64°.

This compound has estrogenic activity, lowers the blood lipid level, and is useful as an intermediate for preparing the hormonal compounds of this invention.

Example 37.—3-methoxy-13β-methyl-8-isogona-1,3,5(10),16-tetraene-17-ol, acetate

Reflux 3 - methoxy - 13β - methyl-8-isogona-1,3,5(10)-trien-17-one (2 g.) with isopropenyl acetate (30 ml.) containing toluene-p-sulfonic acid monohydrate (0.332 g.) for 14 hrs. with slow distillation of the solvent (20 ml.). Add ether (40 ml.) to the cooled solution and wash with 5% aqueous sodium bicarbonate, water, and brine. Remove the solvent under reduced pressure and dissolve the residue in hexane (100 ml.) and chromatograph on Florex (60 g.). Elute with benzene and obtain a yellow gum (1.5 g.) which crystallizes. Recrystallize from petroleum ether to obtain the title product (0.6 g.), M.P. 84–85°.

This compound has estrogenic activity, lowers the blood lipid level, and is useful as an intermediate for preparing the hormonal compounds of this invention.

Example 38.—17β-allyloxy-3-methoxy-13β-methyl-8-isogona-1,3,5(10)-triene

Suspend 3-methoxy - 13β - methyl-8-isogona-1,3,5(10)-trien-17β-ol (3.8 g.) in sodium hydride (3.0 g. of 50% in oil) and xylene (300 ml.). Reflux for 1 hour, add allyl bromide (13.8 ml.) over a period of 1.5 hours, and reflux the reaction mixture an additional 5 hours. Add water and extract the organic layer with 2 N hydrochloric acid. Evaporate the solvent. Dissolve the residue in petroleum ether and chromatograph over neutral alumina. Elute with ether and crystallize from methanol to obtain the title compound, M.P. 96–97°. (Found: C, 80.87; H, 9.27; $C_{22}H_{30}O_2$ requires: C, 80.93; H, 9.26%.)

This compound has estrogenic activity, lowers the blood lipid level, and is useful as an intermediate for preparing the hormonal compounds of this invention.

Example 39.—3-methoxy-13β-methyl-17β-propoxy-8-isogona-1,3,5(10)-triene

Suspend 17β - allyloxy-3-methoxy-13β-methyl-8-osogona-1,3,5(10)-triene (1.0 g.) in alcohol (30 ml.) and hydrogenate at 1 atmosphere in the presence of 10% palladized charcoal (300 mg.) until hydrogen uptake ceases. Filter off the catalyst and evaporate the solvent. Crystallize the residue from methanol to obtain the title compound, M.P. 96–98°. (Found: C, 80.68; H, 9.83; $C_{22}H_{32}O_2$ requires: C, 80.44; H, 9.83%.)

This compound has estrogenic activity, lowers the blood lipid level, and is useful as an intermediate for preparing the hormonal compounds of this invention.

Example 40.—17α-ethynyl-13β-methyl-8-isogona-1,3,5(10)-trien-3,17-diol

Dissolve 3-hydroxy-13β-methyl-8-isogona-1,3,5(10)-trien-17-one (0.8 g.) in tetrahydrofuran (15 ml.) and add to a solution prepared by passing excess acetylene through a suspension of lithium aluminum hydride (1.0 g.) in tetrahydrofuran (30 ml.).

Stir the mixture overnight, decompose with water, and filter. Dry and evaporate the filtrate. Recrystallize the residue from methanol to obtain the title compound (0.45 g.), M.P. 226–228°. (Found: C, 81.17; H, 8.27; $C_{20}H_{24}O_2$ requires: C, 81.04; H, 8.16%.)

This compound has estrogenic activity and is useful as an intermediate for preparing the hormonal compounds of this invention.

Example 41.—17α-ethynyl-3-methoxy-13β-methyl-8-isogona-1,3,5(10)-trien-17-ol

Add 3-methoxy-13β-methyl-8-isogona-1,3,5(10)-trien-17-one (0.5 g.) in toluene (15 ml.) to a solution of potassium (0.6 g.) in tert-amyl alcohol (15 ml.) and pass acetylene through the solution for 48 hours. Add water and isolate the product with ether. Chromatograph on alumina (20 g.). Elute unchanged starting material with benzene and the title compound with benzene ether (3:2) 292 mg., M.P. 135–137°.

This compound has estrogenic activity and is useful as an intermediate for preparing the hormonal compounds of this invention.

Example 42.—17α-ethyl-3-methoxy-13β-methyl-8-isogona-1,3,5(10)-trien-17-ol

Hydrogenate 17α-ethynyl-3-methoxy-13β-methyl-8-isogona-1,3,5(10)-trien-17-ol (0.292 g.) in dioxane (10 ml.) with a 5% palladized charcoal catalyst until uptake of hydrogen ceases (49 ml. absorbed). Filter the catalyst and evaporate the filtrate to give the title compound (0.28 g.).

This compound has estrogenic activity and is useful as an intermediate for preparing the hormonal compounds of this invention.

Example 43.—17α-ethyl-3-methoxy-13β-methyl-8-isogona-2,5(10)-dien-17-ol

Dissolve 17α - ethyl-3-methoxy-13β-methyl-8-isogona-1,3,5(10)-trien-17-ol (0.28 g.) in tetrahydrofuran (6 ml.), ether (14 ml.), and liquid ammonia (60 ml.). Stir and add lithium (0.3 g.) Treat with ethanol (4 ml.) over a 10-minute period to discharge the blue color. Add water and extract the mixture with ether. Wash, dry, and evaporate the ethereal solution to obtain the title compound (0.24 g.); infrared maxima at 2.85, 5.9, 6.0μ.

This compound is useful as an intermediate for preparing the novel compositions of this invention which have hormonal activity.

Example 44.—3-methoxy-13β-methyl-8-isogona-2,5(10)-dien-17β-ol

Dissolve 3 - methoxy-13β-methyl-8-isogona-1,3,5(10)-trien-17β-ol (28 g.) in liquid ammonia (1 l.)-tetrahydrofuran (300 ml.) and reduce with lithium (18 g.) and ethanol. Recrystallize the product from ether to obtain the title compound (18 g.), M.P. 143–147°, ν max. 3472, 1695 and 1669 cm._2. (Found: C, 79.0; H, 9.4; $C_{19}H_{28}O_2$ requires: C, 79.1; H, 9.8%.) Concentrate the mother liquors to obtain further product (3.0 g.), M.P. 140–143°.

This compound is useful as an intermediate for preparing the novel compositions of this invention which have hormonal activity.

Example 45.—3-methoxy-13β-methyl-8-isogona-2,5(10)-dien-17-one

Dissolve 3-methoxy-13β-methyl - 8 - isogona-2,5(10)-dien-17β-ol (20 g.) in toluene (1.3 l.)-cyclohexanone (283 ml.) containing aluminum isopropoxide (16.7 g.). Reflux for 3 hours under nitrogen. Recrystallize the product from aqueous methanol to obtain the title compound, M.P. 106–111° (after softening at 94–96°), ν max. 1724, 1695, and 1667 cm._1.

This compound is useful as an intermediate for preparing the novel compositions of this invention which have hormonal activity.

Example 46.—17α-ethynyl-3-methoxy-13β-methyl-8-isogona-2,5(10)-dien-17β-ol

Saturate dimethylacetamide (1 l.) with acetylene. While slowly bubbling acetylene through the saturated solution, add 3-methoxy-13β-methyl-8-isogona-2,5(10)-dien-17-one (10 g.) and lithium acetylideethylenediamine complex (13.9 g.) and stir for 2 hours at room temperature. Add the mixture to crushed ice-ammonium chloride and extract with ether. Recrystallize the product from methanol to obtain the title compound (8 g.), M.P. 174–182°, ν max. 3401, 3205, 1695, and 1667 cm.⁻¹.

This compound is useful as an intermediate for preparing the novel compositions of this invention which have hormonal activity.

Example 47.—17β-hydroxy-13β-methyl-8-isogon-5(10)-en-3-one, cyclic ethylene acetal Add 3.6 g. 3-methoxy-13β-methyl-8-isogona-2,5(10)-dien-17β-ol in 40 ml. benzene to a mixture of 0.36 g. p-toluenesulfonic acid and 7.2 ml. ethylene glycol in 70 ml. benzene, and reflux for 20 hours, using a Dean-Stark trap. Cool, wash with saturated sodium bicarbonate solution, water, and brine, and dry over sodium sulfate. Evaporate to obtain 3.6 g. of title compound, M.P. 118–123°. IR 3.05, 9.1, 9.45μ.

This compound has estrogenic activity and is useful as an intermediate for preparing the hormonal compounds of this invention.

Example 48.—13β-methyl-8-isogon-5(10)-ene-3,17-dione, cyclic 3-ethylene acetal

Dissolve 0.69 g. 17β-hydroxy-13β-methyl-8-isogon-5(10)-en-3-one, cyclic ethylene acetal, in 10 ml. pyridine and add 0.6 g. chromium trioxide with cooling. After letting stand for 20 hours at room temperature, add 10 ml. ethyl acetate and filter through a short column of alumina (10 g.). Evaporate and crystallize from ethanol to obtain 0.56 g. of title compound, M.P. 139–148°. IR 5.75, 9.0μ.

This compound has estrogenic activity and is useful as an intermediate for preparing the hormonal compounds of this invention.

Example 49.—17α-ethynyl-17-hydroxy-13β-methyl-8-isogon-5(10)-en-3-one, cyclic ethylene acetal Add 0.56 g. 13β-methyl-8-isogon-5(10)-ene-3,17-dione, cyclic 3-ethylene acetal, in 20 ml. toluene to a stirred solution of 0.56 g. potassium in 20 ml. t-amyl alcohol in an atmosphere of nitrogen. Pass a purified stream of acetylene through the mixture for 20 hours. Add water, extract with ether, wash with water, and dry. After evaporation, dissolve in 5 ml. benzene and absorb on 50 g. alumina. Elute with 60-80° light petroleum containing increasing amount of benzene. Petroleum-benzene (1:9) and benzene elute unchanged ketone (0.16 g.). Benzene-ether (6:4) elutes 0.26 g. of title compound, M.P. 168–170°, after recrystallization from light petroleum. IR 2.93, 3.1, 9.5μ.

This compound has progestational activity and is useful as an intermediate for preparing the hormonal compounds of this invention.

Example 50.—17α-ethynyl-13β-methyl-8-isogon-5-ene-3,17β-diol

Reduce 0.85 g. 17α-ethnyl-17β-hydroxy-13β-methyl-8-isogon-5(10)-en-3-one with 0.3 g. sodium borohydride in 50 ml. methanol. Recrystallize from ether to obtain 0.5 g., of title compound, M.P. 193–203°.

Calc'd for: $C_{20}H_{28}O_2$: C, 79.95; H, 9.33%. Found: C, 79.05; H, 9.33%.

This compound has progestational activity and is useful as an intermediate for preparing the hormonal compounds of this invention.

Example 51.—17α-ethyl-17-hydroxy-13β-methyl-8-isogon-4-en-3-one

Treat a solution of 17α-ethyl-13β-methyl-3-methoxy-8-isogona-2,5(10)-dien-17-ol (0.24 g.) in methanol (10 ml.) with hydrochloric acid (0.6 ml.) and water (0.5 ml.). Allow the mixture to stand for 2 hours. Add water and remove most of the methanol under reduced pressure. Extract the mixture with ether and wash, dry, and evaporate the ethereal solution to give a solid (0.18 g.). Chromatograph on neutral alumina, benzene-ether (19:1) and benzene-ether (7:3). Elute a series of fractions. Combine the fractions and crystallize from methanol to obtain a mixture of 17α - ethyl - 17 - hydroxy-13β-methyl-8-isogon-5(10)-en-3-one and the title compound (about 25%), M.P. 139–164°; infrared maxima at 2.9, 6.05, 5.9μ.

This compound has anabolic and androgenic activity and is useful as an intermediate for preparing the hormonal compounds of this invention.

Example 52.—17β-hydroxy-13β-methyl-8-isogon-4 [and 5(10)]-en-3-one

Stir 3-methoxy-13β-methyl-8-isogona-2,5(10)-dien-17β-ol (0.35 g.) with methanol (20 ml.) and 6 N hydrochloric acid (10 ml.) for 30 minutes. Add water and extract the mixture with ether. Wash, dry, and evaporate the ethereal solution. Recrystallize the residue from ethyl acetate-hexane to obtain a mixture of 17β-hydroxy-13β-methyl-8-isogon-4[and 5(10)]-en-3-one (0.182 g.), M.P. 110–158°, ν max. 3350, 1700, and 1655 cm.$^{-1}$.

This compound has anabolic and androgenic activity and is useful as an intermediate for preparing the hormonal compounds of this invention.

Example 53.—17α-ethynyl-17β-hydroxy-13β-methyl-8-isogon-4[and 5(10)]-en-3-one Dissolve 17α - ethynyl-17-hydroxy-13β-methyl-8-isogon-5(10)-en-3-one (0.3 g.) in methanol (36 ml.)-concentrated hydrochloric acid (2.4 ml.)-water (1.6 ml.). Stir under nitrogen for 3 hours to obtain a total crude crystalline product with infrared absorption bands of comparable intensities at 1704 and 1653 cm.$^{-1}$. Recrystallize from ethyl acetate to obtain crystals of 17α-ethynyl-17-hydroxy - 13β - methyl - 17-hydroxy-13β-methyl-8-isogon-4-en-3-one (0.15 g.), M.P. 180–192°, ν max. 3367, 3215, 2083, 1701, and 1650 cm.$^{-1}$, the penultimate band being approximately twice as intense as the last band. (Found: C, 80.4; H, 8.8%.)

This compound has progestational activity and is useful as an intermediate for preparing the hormonal compounds of this invention.

Example 54.—17β-hydroxy-13β-methyl-8-isogon-5(10)-en-3-one

Stir 3-methoxy-13β-methyl-8-isogona-2,5(10)-dien-17β-ol (1 g.) for one hour in methanol (60 ml.)-water (14 ml.) containing oxalic acid (from the dihydrate, 1.2 g.). Add saturated aqueous sodium hydrogen carbonate and extract the mixture with ether.

Recrystallize the product from ethyl acetate to obtain the title compound (0.72 g.), M.P. 170–172°, ν max. 3350 and 1770 cm.$^{-1}$. (Found: C, 78.8; H, 9.5. $C_{18}H_{26}O_2$ requires: C, 78.8; H, 9.55%.)

This compound is useful as an intermediate for preparing the novel compositions of this invention which have hormonal activity.

Example 55.—17α-ethynyl-17β-hydroxy-13β-methyl-8-isogon-5(10)-en-3-one

Dissolve 17α - ethynyl-17-hydroxy-13β-methyl-8-isogon-5(10)-en-3-one, cyclic ethylene acetal in t-amyl alcohol (10 ml.)-toluene (10 ml.)-5 N hydrochloric acid (40 ml.) and reflux for 10 minutes. Evaporate the organic solvents, add water, and extract the mixture with ether-ethyl acetate. Chromatograph the product on neutral alumina to obtain the title compound (0.39 g.), M.P. 185–190°, ν max. 3378, 3215, 2083, 1704, and 1642 (weak) cm.$^{-1}$.

This compound has progestational activity and is useful as an intermediate for preparing the hormonal compounds of this invention.

Example 56.—17α-ethynyl-17-hydroxy-13β-methyl-8-isogon-5(10)-en-3-one

Dissolve 17α-ethynyl-3-methoxy-13β-methyl-8-isogona-2,5(10)-dien-17-ol (8 g.) in methanol (500 ml.)-water (90 ml.) containing oxalic acid (from the dihydrate (10.3 g.)). Stir for 2 hours. Recrystallize the product from ethyl acetate to obtain the title compound (5.045 g.), M.P. 185–191°, ν max. 3367, 2088, and 1701 cm.$^{-1}$, homogeneous by thin-layer chromatography. (Found: C, 80.0; H, 8.6. $C_{20}H_{26}O_2$ requires: C, 80.5; H, 8.8%.)

This compound has progestational activity and is useful as an intermediate for preparing the hormonal compounds of this invention.

Example 57.—3ε, 17β-dihydroxy-17-ethynyl-13β-methyl-8-isogon-5(10)-en, 3-acetate Dissolve 17α-ethynyl-17-hydroxy-13β-methyl-8-isogon-5(10)-en-3-one (500 mg.) in methanol (50 ml.) and reduce with sodium borohydride (200 mg.). Pour into brine, extract with ether, dry over sodium sulfate, and remove solvents. Dissolve the crystalline product in pyridine (5 ml.) and add acetic anhydride (5 ml.). Stir at room temperature for 20 hours. Add water and extract into ether. Wash the organic layer successively with water, 10% hydrochloric acid, water, saturated sodium bicarbonate solution, and water. Dry the organic solution and remove the solvent. Crystallize the remaining gum from ether-hexane to obtain the title compound (110 mg.), M.P. 165–174°; ultraviolet spectrum showing no selective absorption; infrared maxima (potassium bromide) at 2.90, 3.11, 5.80, 7.93, 9.03, 9.23μ; infrared maxima (carbon disulfide) at 2.81, 3.06, 5.75, 7.85, 8.04, 9.57μ. (Found: C, 77.09; H, 8.62. $C_{22}H_{30}O_3$ requires: C, 77.15; H, 8.83%.) Evaporate the ether-hexane mother liquors to obtain a fraction of title compound with M.P. 117–127° (no depression of M.P. of major fraction); infrared maxima (potassium bromide) at 3.06, 3.11; 3.80, 7.93, 8.05, 9.04, 9.75μ; infrared maxima (carbon disulfide) at 2.81, 3.06, 5.76, 7.85, 8.05, 9.58μ.

This compound has progestational activity and is useful as an intermediate for preparing the hormonal compounds of this invention.

Example 58.—17β-(2-dimethylaminoethoxy)-3-methoxy-13-propyl-8-isogona-1,3,5(10)-triene To a suspension of 3-methoxy-13β-propyl-8-isogona-1,3,5(10)-trien-17β-ol (3.14 g.) in benzene (15 ml.), add sodamide (860 mg.) in benzene (15 ml.) and reflux for two hours. Cool reaction mixture, add 2-dimethylaminoethyl chloride hydrochloride (1.58 g.), and reflux for 16 hours. Pour reaction mixture over ice, make acidic with hydrochloric acid (10%), and extract suspension with ether. Make suspension basic with sodium hydroxide (15%) and extract with ether. Separate the ether layer, wash, and dry. Evaporate solvent to obtain a residue. Recrystallize from aqueous methanol to obtain the title compound (500 mg.), M.P. 75–76°; infrared spectrum showing no hydroxyl group, ultraviolet absorption peak at 280 mμ (ε2,190). (Found: C, 77.52; H, 9.85; N, 3.46. $C_{25}H_{39}NO_2$ requires: C, 77.29; H, 10.20; N, 3.63%.)

This compound has estrogenic activity, lowers the blood lipid level, and is useful as an intermediate for preparing the hormonal compounds of this invention.

Example 59.—17β-(1-ethoxycyclopentyloxy)-13β-ethyl-3-methoxy-8-isogona-1,3,5(10)-triene Treat 13β-ethyl-3-methoxy - 8 - isogona-1,3,5(10)-trien-17β-ol (1 g.) with cyclopentanone diethyl acetal (5 ml.) and a trace of p-toluenesulfonic acid. Warm the reaction mixture on the steam bath for one hour, then cool and make basic with pyridine. Pour into water and extract with ether. Wash and dry the ethereal solution, taking it to dryness by warming on the rotary evaporator (ultimately at .1 mm.). Treat the residue with a few drops of pyridine and crystallize from cyclohexane-hexane to obtain starting material. Triturate the mother liquor from the crystallization with acetone to obtain a solid. Recrystallize from acetone to obtain the title compound, M.P. 79–81°; infrared showing characteristic aliphatic ether absorption between 8.75 and 10.5$\mu$. (Found: C, 78.55; H, 9.55. $C_{27}H_{40}O_3$ requires: C, 78.59; H, 9.77%.)

This compound has estrogenic activity, lowers the blood lipid level, and is useful as an intermediate for preparing the hormonal compounds of this invention.

Example 60.—13$\beta$-ethyl-3-methoxy-17$\beta$-(tetrahydropyran-2-yloxy)-8-isogona-1,3,5(10)-triene Dissolve 13$\beta$ - ethyl - 3 - methoxy-8-isogona-1,3,5(10)-trien-17$\beta$-ol (500 mg.) in 2,3-dihydropyran (5 ml.) and ether (3 ml.). Treat with 2 drops of hydrochloric acid and allow to stand for 3 days. Dilute the reaction mixture with ether, wash successively with saturated bicarbonate solution, water, and saturated salt solution, and dry over sodium sulfate. Remove solvents to obtain a gum. Crystallize from hexane and dry over phosphorus pentoxide at .1 mm. to obtain the title compound (370 mg.), M.P. 127–129°; infrared maxima at 6.22, 6.32, 9.00, 9.43, 9.68, 10.25$\mu$ (no hydroxyl group remaining).

This compound has estrogenic activity, lowers the blood lipid level, and is useful as an intermediate for preparing the hormonal compounds of this invention.

Example 61.—13$\beta$-ethyl-3-(2-heptenyloxy)-8-isogona-1,3,5(10)-trien-17$\beta$-ol Dissolve 13$\beta$-ethyl-8-isogona-1,3,5(10)-trien-3,17$\beta$-diol (2 g.) and sodium ethoxide (from 200 mg. sodium) in ethanol (30 ml.). Add 1-bromohept-2-yne (5 ml.) and heat the mixture under reflux for 16 hours. Evaporate the solvent in vacuo, take up the residue in ether, wash successively with water, 2 N sodium hydroxide, water, and brine, and dry over magnesium sulfate. Evaporate the ether to obtain a yellow oil (2.36 g.). Chromatograph on a column of Florex (150 g.). Elute with benzene-petroleum ether (3:1) and then with benzene to obtain the crude heptynyl ether as a gum ($\epsilon$914 mg.). To obtain the title compound, dissolve in benzene ($\epsilon$50 ml.) and hydrogenate at atmospheric pressure over 5% palladium-barium sulfate until one mole of hydrogen has been absorbed. Filter the catalyst and evaporate the solvent to obtain the title product.

This compound has estrogenic activity, lowers the blood lipid level, and is useful as an intermediate for preparing the hormonal compounds of this invention.

Example 62.—13$\beta$-ethyl-3-hydroxy-8-isogona-1,3,5(10)-trien-17-one, potassium sulfate Dissolve 13$\beta$ - ethyl - 3 - hydroxy - 8 - isogona - 1,3,5(10)-trien-17-one (1.013 g.- in dry pyridine (5 ml.). Add sulfamic acid (1.1 g.) and stir the mixture at 80° for 2 hours. Cool and pour into dry ether. Filter off the precipitated pyridinium salt, wash with ether, and dry over phosphorus pentoxide overnight. Add 2.6 g. to a well stirred mixture of pyridine (8.5 ml.) and 12% aqueous potassium hydroxide (15 ml.). Separate the resulting organic layer and evaporate to dryness in vacuo to obtain the title compound as a light brown solid. Wash the compound by decanting with dry ether (3×50 ml.) and then recrystallize from methanol (150 ml.).

This compound has estrogenic activity and is useful as an intermediate for preparing the hormonal compounds of this invention.

Example 63.—13$\beta$ - ethyl - 8 - isogona - 1,3,5(10)-triene-3,17$\beta$-diol, 17- acetate Heat 13$\beta$ - ethyl - 8 - isogona - 1,3,5(10) - triene - 3, 17$\beta$-diol (500 mg.) under reflux with glacial acetic acid for 5 hours. Pour the mixture into water. Extract the resulting precipitate into ether. Wash successively with water (2×100 ml.), aqueous sodium bicarbonate, and brine. Dry over magnesium sulfate and evaporate the solvent. Recrystallize the residue from methanol to obtain the title compound (229 mg.), M.P. 164–165° (softens at 130°); ultraviolet absorption peak at 279 m$\mu$ ($\epsilon$2,210), with shoulder at 285 m$\mu$ ($\epsilon$2,030). (Found: C, 75.12. H, 8.36. $C_{21}H_{28}O_3$ .1/2$CH_3OH$ requires: C, 74.99; H, 8.57%.)

This compound has estrogenic activity, lowers the blood lipid level, and is useful as an intermediate for preparing the hormonal compounds of this invention.

Example 64.—13$\beta$ - ethyl - 8 - isogona - 1,3,5(10)-triene-3,17$\beta$-diol, 3-benzoate Add 13$\beta$ - ethyl - 8 - isogona - 1,3,5(10) - triene - 3,17$\beta$-diol (2.0 g.) to warm 0.5 N potassium hydroxide (1140 ml.) and follow by benzoyl chloride (20 ml.). Shake the mixture for 10 minutes and allow to stand at room temperature for 16 hours. Filter the resulting precipitate, recrystallize from aqueous ethanol, and dry over phosphorus pentoxide to obtain the title compound (2.5 g., 92%), M.P. 176–179°; ultraviolet absorption peaks at 230.5 m$\mu$ ($\epsilon$21,800), 264 m$\mu$ ($\epsilon$4,450), and 273.5 m$\mu$ ($\epsilon$3,900). (Found: C, 79.57; H, 7.57. $C_2H_{30}O_3$ requires: C, 79.96; H, 7.74%.)

This compound has estrogenic activity, lowers the blood lipid level, and is useful as an intermediate for preparing the hormonal compounds of this invention.

Example 65.—13$\beta$ - ethyl - 3 - methoxy - 8 - isogona-1,3,5(10)-trien-17$\beta$-ol, 10-undecenoate Dissolve 13$\beta$ - ethyl - 3 - methoxy - 8 - isogona - 1,3,5(10)-trien-17$\beta$-ol (2.0 g.) in pyridine (10 ml.), benzene (15 ml.), and 10-undecenoyl chloride (3 ml.) and keep at room temperature over night. Pour the reaction mixture into ice water and acidify with 2 N hydrochloric acid. Extract the material with ether, wash the ethereal extract successively with water and brine, and dry over magnesium sulfate. Evaaporate the solvent. Recrystallize the residue from tetrahydrofuran and methanol to obtain the title compound (1.7 g.), M.P. 52.5–55°; infrared spectrum showing no absorption at 3.0$\mu$, strong band at 5.80$\mu$. (Found: C, 79.67; H, 9.88 $C_{31}H_{46}O_3$ requires: C, 79.78; H, 9.94%.)

This compound has estrogenic activity, lowers the blood lipid level, and is useful as an intermediate for preparing the hormonal compound of this invention.

Example 66.—13$\beta$ - ethyl - 3 - methoxy - 8 - isogona-1,3,5(10)-trien-17$\beta$-ol, propionate Dissolve 13$\beta$ - ethyl - 3 - methoxy - 8 - isogona - 1,3,5(10)-trien-17$\beta$-ol (2.0 g.) in pyridine (10 ml.) and propionic anhydride (15 ml.). Keep over night at room temperature. Pour the reaction mixture into ice water and extract with ether. Wash the ethereal layer successively with water and brine and dry over magnesium sulfate. Evaporate the solvent. Recrystallize from methanol to obtain the title compound (1.4 g.), M.P. 75–77°; infrared spectrum showing no remaining hydroxyl group. (Found: C, 77.38; H, 8.92. $C_{23}H_{32}O_3$ requires: C, 77.49; H, 9.05%.)

This compound has estrogenic activity, lowers the blood lipid level, and is useful as an intermediate for preparing the hormonal compounds of this invention.

Example 67.—13$\beta$ - ethyl - 3 - methoxy - 8 - isogona 1,3,5(10)-trien-17$\beta$-ol, acetate Dissolve 13$\beta$ - ethyl - 3 - methoxy - 8 - isogona - 1,3,5 (10)-trien-17$\beta$-ol (2.0 g.) in pyridine (10 ml.) and acetic anhydride (15 ml.). Keep the solution over night at room temperature. Pour the reaction mixture into ice water and acidify with 2 N hydrochloric acid. Extract with ether, wash the ethereal layer successively with water and brine, and dry over magnesium sulfate. Evaporate the solvent. Recrystallize the residue from methanol to obtain the title compound (2.0 g.), M.P. 95–97°; infrared spectrum showing no remaining hydroxyl group. (Found: C, 77.38; H, 8.88. $C_{22}H_{30}O_3$ requires: C, 77.15; H, 8.83%.)

This compound has estrogenic activity, lowers the blood lipid level, and is useful as an intermediate for preparing the hormonal compounds of this invention.

Example 68.—13β - ethyl - 3 - hydroxy - 8 - isogona 1,3,5(10)-trien-17-one, acetate Acetylate 13β - ethyl - 3 - hydroxy - 8 - isogona - 1,3,5 (10)-trien-17-one (296 mg.) with acetic anhydride (1 ml.) in pyridine (1.75 ml.) at 100° for 1.5 hour. Extract from water with ether. Recrystallize from ethanol to obtain the title compound as pale pink needles (164 mg.), M.P. 140–142°. (Found: C, 77.21; H, 8.07. $C_{21}H_{28}O_3$ requires: C, 77.27; H, 8.03%.)

This compound has estrogenic activity, lowers the blood lipid level, and is useful as an intermediate for preparing the hormonal compounds of this invention.

Example 69.—13β - ethyl - 3 - heptyloxy - 8 - isogona 1,3,5(10)-trien-17β-ol

Dissolve sodium borohydride (250 mg.) in ethanol (5 ml.) and add 13β-ethyl-3-heptyloxy-8-isogona-1,3,5(10)-trien-17-one. (800 mg.). Heat under reflux for 2 hours. Cool and evaporate to dryness. Treat with an excess of dilute acetic acid and extract with ether. Combine the ether extracts, successively with saturated potassium bicarbonate, water, and brine, and dry over magnesium sulfate. Evaporate the ether to obtain a colorless gum. Crystallize from methanol to obtain the title compound as fine, white needles (661 mg., 83%), M.P. 52–55°; ultraviolet absorption peaks at 278 mμ ($\epsilon$2,050) and 286 mμ ($\epsilon$1,880). (Found: C, 81.18; H, 10.18. $C_{26}H_{46}O_2$ requires: C, 81.20; H, 10.48%.)

This compound has estrogenic activity, lowers the blood lipid level, and is useful as an intermediate for preparing the hormonal compounds of this invention.

Example 70.—13β-ethyl-3-heptyloxy-8-isogona-1,3,5(10)-trien-17-one

Dissolve the 13β-ethyl-3-hydroxy-8-isogona-1,3,5(10)-trien-17-one (2.21 g.) and sodium ethoxide (from 255 mg. sodium) in ethanol (30 ml.) and add heptyl bromide (5 ml.). Heat the mixture under reflux for 16 hours. Evaporate to dryness, take up in ether, wash successively with 2 N sodium hydroxide, water, and brine, and dry over magnesium sulfate. Evaporate in vacuo to obtain a pole red gum which will crystallize slowly upon standing. Recrystallize from ethanol to obtain the title compound as fine, colorless needles (1.37 g., 48%), M.P. 44–46°; ultraviolet absorption peaks at 277 mμ ($\epsilon$ 2,120) and 285 mμ ($\epsilon$ 1,970). (Found: C, 81.86; H, 10.09. $C_{26}H_{38}O_2$ requires: C, 81.62; H, 10.01%.)

This compound has estrogenic activity, lowers the blood lipid level, and is useful as an intermediate for preparing the hormonal compounds of this invention.

Example 71.—13β-ethyl-8-isogona-1,3,5(10)-triene-3,17β-diol, diacetate

Dissolve 13β - ethyl-8-isogona-1,3,5(10)-trien-3-ol-17-one (715 mg.) in ethanol (15 ml.) and sodium borohydride (35.0 mg.) and heat under reflux for 90 minutes. Evaporate the solution to dryness, add water and ether, and acidify the mixture with glacial acetic acid. Separate the ethereal layer, wash successively with saturated potassium bicarbonate and brine, and dry over magnesium sulfate. Evaporate the solvent. Recrystallize the residue twice from methanol to obtain the dial (529 mg., 74%), M.P. 217–219°. Acetylate 246 mg. wath acetic anhydride (1 ml.) in pyridine (1.5 ml.) at 100° for 1.5 hour. Extract the crude product from water with ether. Recrystallize from ethanol to obtain the title compound as a white solid (255 mg., 80%), M.P. 128.5–129.5°; ultraviolet absorption peaks at 273.5 mμ ($\epsilon$ 800) and 266.5 mμ ($\epsilon$ 780). (Found: C, 74.59; H, 7.96. $C_{23}H_{30}O_4$ requires: C, 74.56; H, 8.16%.)

This compound has estrogenic activity, lowers the blood lipid level, and is useful as an intermediate for preparing the hormonal compounds of this invention.

Example 72.—13β-ethyl-17β-(2-hydroxyethoxy)-3-methoxy-8-isogona-1,3,5(10)-triene Dissolve the 13β-ethyl-3-methoxy-8-isogona-1,3,5(10)-trien-17-one, cyclic ethylene acetal (3.42 g.) in anhydrous ether and react for 2 hours with a solution of aluminum chloride (2.66 g.), anhydrous ether (20 ml.), and 1 M lithium aluminum hydride (5 ml.) in ether. Acidify the reaction mixture with 2 N sulfuric acid and extract with ether. Treat the crystalline product with methanolic hydrochloric acid. Evaporate and recrystallize from alcohol to obtain the title compound (2.0 g.), M.P. 110–111°; infrared maximum at 2.95μ, ultraviolet absorption peak at 278 mμ ($\epsilon$ 2,490). (Found: C, 76.95; H, 9.15. $C_{22}H_{28}O_3$ requires: C, 76.60; H, 9.36%.)

This compound has estrogenic activity, lowers the blood lipid level, and is useful as an intermediate for preparing the hormonal compounds of this invention.

Example 73.—13β-ethyl-17β-(2-hydroxyethoxy)-3-methoxy-8-isogona-1,3,5(10)-triene, methanesulfonate Dissolve 13β-ethyl-17β-(2-hydroxyethoxy)-3-methoxy-8-isogona-1,3,5(10)-triene (7.0 g.) in pyridine (47 ml.) and cool in a Dry Ice-acetone bath. Add mesyl chloride (2.8 g.) while stirring over a 2 hour period. Continue stirring at 25° over night. Add water, and filter off the resulting precipitate. Recrystallize from methanol to obtain the title compound ($\epsilon$ 5.5 g.), M.P. 95–97°; ultraviolet absorption peak at 279 mμ ($\epsilon$ 2,210); infrared spectrum showing no remaining hydroxyl group. (Found: C, 65.66; H, 7.98; S, 7.60. $C_{23}H_{34}O_5$ requires: C, 65.37; H, 8.11; S, 7.60%.)

This compound is useful as an intermediate for preparing the novel compositions of this invention which have hormonal activity.

Example 74.—13β-ethyl-17β-(2-fluoroethoxy)-3-methoxy-8-isogona-1,3,5(10)-triene

Dissolve 13β-ethyl-17β-(2-hydroxyethoxy)-3-methoxy-8-isogona-1,3,5(10)-triene (2.5 g.) in methylene chloride (48 ml.) and treat with 2-chloro-1,1,2-trifluoro-triethylamine (2.4 ml.). Allow to stand for 20 hours at room temperature. Wash successively with ice water, sodium bicarbonate solution, and brine. Dissolve the crude product in a solution of methanol (75 ml.), ethanol (75 ml.), potassium hydroxide (500 mg.), and water (2 ml.). After 20 hours, dilute the reaction mixture with water, acidify with 2 N hydrochloric acid, and chromatograph the resulting precipitate over neutral alumina (grade I). Elute with ether-benzene and crystallize the eluate with methanol to obtain the title compound (500 mg.), M.P. 102–104°. (Found: C, 76.41; H, 9.21. $C_{22}H_{31}O_2F$ requires: C, 76.36; H, 9.02%.)

This compound has estrogenic activity, lowers the blood lipid level, and is useful as an intermediate for preparing the hormonal compounds of this invention.

Example 75.—13β-ethyl-3-methoxy-17β-(2-piperidinoethoxy)-8-isogona-1,3,5(10)-triene Dissolve 13β-ethyl-17β-(2-hydroxyethoxy)-3-methoxy-8-isogona-1,3,5(10)-triene, methanesulfonate (4.0 g.) in piperidine (100 ml.) and reflux for 18 hours. Evaporate the solvent and dissolve the residue in 10% acetic acid (150 ml.). Extract the acidic solution with ether, basify the aqueous layer with 10% sodium hydroxide, and again extract with ether. Wash the ethereal solution successively with water and brine and dry over magnesium sulfate. Evaporate the solvent. Recrystallize the residue from methanol-water to obtain the title compound (2.1 g.), M.P. 82–83°. (Found: C, 78.87; H, 9.73; N, 3.38. $C_{27}H_{41}O_2N$ requires: C, 78.78; H, 10.04; N, 3.40%.)

This compound has estrogenic activity, lowers the blood lipid level, and is useful as an intermediate for preparing the hormonal compounds of this invention.

Example 76.—17β-ethoxy-13β-ethyl-3-methoxy-8-isogona-1,3,5(10)-triene

Suspend 13β-ethyl-3-methoxy-8-isogona-1,3,5(10)-trien-17β-ol (5.0 g.) in xylene (100 ml.) and sodium hydride (3.83 g. of 50% in oil). Reflux for 1.5 hour under nitrogen. Add ethyl iodide (14.5 ml.) over a period of 4.5 hours while stirring. Continue refluxing over night. Pour the reaction mixture over ice, acidify with 2 N hydrochloric acid, and extract with benzene. Wash the organic layer with saturated sodium bicarbonate solution and dry over magnesiumsulfate. Remove the solvent. Recrystallize the residue from absolute alcohol (25 ml.). Purify over alumina (neutral grade I). Elute with benzene, evaporate to dryness, and recrystallize from methanol-water to obtain the title compound (4.1 g.), M.P. 89–91°; ultraviolet absorption peak at 278 m$\mu$ ($\epsilon$2,120), infrared spectrum showing no remaining hydroxyl group. (Found: C, 80.53; H, 9.60. $C_{22}H_{32}O_2$ requires: C, 80.44; H, 9.83%.)

This compound has estrogenic activity, lowers the blood lipid level, and is useful as an intermediate for preparing the hormonal compounds of this invention.

Example 77.—17β-allyloxy-13β-ethyl-3-methoxy-8-isogona-1,3,5(10)-triene

Dissolve 13β-ethyl-3-methoxy-8-isogona-1,3,5(10)-trien-17β-ol (5.0 g.) in xylene (100 ml.). Reflux for 30 minutes under a Dean-Stark water separator. Add sodium hydride (3.0 g. of 50% in oil). Reflux, with stirring, for 1.5 hour. Add allyl bromide (15 ml.) during a 3-hour period. Reflux the reaction mixture over night. Cool, acidify with hydrochloric acid (10%), add water, and extract the product (7 g.) with benzene. Dissolve the crude product in hexane and separate from the oil on an alumina column. Elute with ether. Recrystallize successively from methanol and then hexane to obtain the title compound (3.6 g.) M.P. 80–81°; ultraviolet absorption peak at 279 m$\mu$ ($\epsilon$2,090); infrared spectrum showing no remaining hydroxyl group. (Found: C, 81.41; H, 9.63. $C_{23}H_{32}O_2$ requires: C, 81.13; H, 9.47%.)

This compound has estrogenic activity, lowers the blood lipid level, and is useful as an intermediate for preparing the hormonal compounds of this invention.

Example 78.—13β-ethyl-3-methoxy-17β-propoxy-8-isogona-1,3,5(10)-triene

Dissolve 17β-allyloxy-13β-ethyl-3-methoxy-8-isogona-1,3,5(10)-triene (1.8 g.) in benzene (100 ml.). Hydrogenate at 1 atmosphere in the presence of 10% palladized charcoal (600 mg.) until hydrogen uptake ceases. Filter off the catalyst and evaporate the solvent. Recrystallize from hexane to obtain the title compound (700 mg.), M.P. 95–98°. (Found: C, 80.84; H, 9.94. $C_{23}H_{34}O_2$ requires: C, 80.64; H, 10.01%.)

This compound has estrogenic activity, lowers the blood lipid level, and is useful as an intermediate for preparing the hormonal compounds of this invention.

Example 79.—3-allyloxy-13β-ethyl-8-isogona-1,3,5(10)-trien-17β-ol

Dissolve 13β-ethyl-8-isogona-1,3,5(10)-triene-3,17β-diol (1.01 g.) and sodium ethoxide (from 106 mg. sodium) in ethanol (10 ml.). Add allyl bromide (0.5 ml.) and heat the mixture under reflux for 15 minutes. Add more allyl bromide (1 ml.) and continue refluxing for 90 minutes. Evaporate to dryness, take up the product in di-isopropyl ether, wash the ethereal layer successively with 10% sodium hydroxide, water, and brine, and dry over magnesium sulfate. Evaporate the solvent in vacuo. Recrystallize the residue from methanol to obtain the title compound (510 mg., 44%), M.P. 77–79°; ultraviolet absorption peaks at 277 m$\mu$ ($\epsilon$1,990) and 285 m$\mu$ ($\epsilon$1,870). (Found: C, 80.70; H, 9.24. $C_{22}H_{30}O_2$ requires: C, 80.93; H, 9.26%.)

This compound has estrogenic activity, lowers the blood lipid level, and is useful as an intermediate for preparing the hormonal compounds of this invention.

Example 80.—13β-ethyl-16-hydroxymethylene-3-methoxy-8-isogona-1,3,5(10)-trien-17-one Dissolve 13β - ethyl - 3 - methoxy-8-isogona-1,3,5(10)-trien-17-one (5.0 g.) in benzene (50 ml.) and treat with 30 ml. ethylformate (distilled over phosphorus pentoxide) and 1.7 g. of sodium methoxide. Reflux the reaction mixture for 2 hours, then allow to stand over night at room temperature. Pour over ice and extract with ether. Acidify the aqueous layer with 10% hydrochloric acid, extract with ether, wash the organic layer with brine, and dry over magnesium sulfate. Evaporate the solvent. Recrystallize the residue from acetone-water to obtain the title compound (2.6 g.), M.P. 147–152°. (Found: C, 77.01; H, 7.81. $C_{21}H_{26}O_3$ requires: C, 77.27; H, 8.03%.)

This compound has estrogenic activity, lowers the blood lipid level, and is useful as an intermediate for preparing the hormonal compounds of this invention.

Example 81.—13β-ethyl-16$\epsilon$-fluoro-3-methoxy-8-isogona-1,3,5(10)-trien-17-one Dissolve 13β-ethyl-16-hydroxymethylene-3-methoxy-8-isogona-1,3,5(10)-trien-17-one (1.5 g.) in tert-butyl alcohol (50 ml.) and combine with a solution of potassium (0.8 g.) in tert-butyl alcohol (100 ml.). Add dropwise, while stirring continuously over a 5-minute period, a solution of potassium (0.4 g.) in tert-butyl alcohol (50 ml.). Simultaneously pass perchloryl fluoride through this reaction mixture for a total of 15 minutes. Pour reaction mixture over ice and allow to stand over night. Extract mixture with ether. Wash organic layer successively with sodium hydroxide (10%) solution, hydrochloric acid (5%) solution, and saturated sodium bicarbonate solution. Dry the washed organic layer over magnesium sulfate. Evaporate the solvent and recrystallize the residue from methanol to yield a product (900 mg.) which is a 50/50 mixture of 13β-ethyl-16,16 - difluoro - 3 - methoxy-8-isogona-1,3,5 (10)-trien - 17 - one and the title compound; infrared maxima at 5.65, 5.71$\mu$. (Found: F, 8.7; a 50/50 mixture of mono and difluorosteroids requires: F, 8.7%.)

This compound has estrogenic activity, lowers the blood lipid level, and is useful as an intermediate for preparing the hormonal compounds of this solution.

Example 82.—13β-ethyl-16,16-difluoro-3-methoxy-8-isogona-1,3,5(10)-trien-17β-ol

Dissolve 13β-ethyl-16,16-difluoro-3-methoxy-8-isogona-1,3,5(10)-trien-17-one (800 mg.) in tetrahydrofuran (80 ml.). Stir well. Cool the solution in an ice water bath and, at the same time, add lithium aluminum tri(tertiary-butoxy)hydride (2.4 g.) in tetrahydrofuran (20 ml.). Allow to stand at room temperature over night. Mix with water, neutralize with acetic acid, and extract with ether. Wash the organic layer with a saturated sodium bicarbonate solution and dry over magnesium sulfate. Evaporate the solvent. Recrystallize the residue from methanol to obtain a mixture (apparently 50:50) of the title compound with the corresponding monofluoro compound (260 mg.), M.P. 149–151°; infrared maxima at 2.9$\mu$. (Found: F, 8.2%; 50/50 mixture requires: F, 8.6%.)

This compound has estrogenic activity, lowers the blood lipid level, and is useful as an intermediate for preparing the hormonal compounds of this invention.

Example 83.—13β-ethyl-3-methoxy-8-isogona-1,3,5(10)-tiene-16,17-dione, 16-oxime

Stir 13β-ethyl-3-methoxy-8-isogona-1,3,5(10)-trien-17-one (6.8 g.) with a solution of potassium tert-butoxide (from the metal 1.7 g.) in tert-butanol (70 ml.) for 5 hours, and then add isoamyl nitrite (5.1 ml.) and stir for 16 hours. Warm to 50° for 2 hours, and then cool and pour into ice-water and extract with ether. Acidify the aqueous solution wih acetic acid and extract with ether. Wash and dry the ethereal extracts, evaporate and recrystallize the residue from ether, ethyl acetate and methanol to obtain the title compound (2.4 g.) M.P. 202–203°.

This compound is useful as an intermediate for preparing the novel compositions of this invention which have hormonal activity.

Example 84.—13β-ethyl-3-methoxy-17β-hydroxy - 8 - isogona-1,3,5(10)-trien-16-one Stir a suspension of 13β-ethyl-3-methoxy-8-isogona-1,3,5(10)-trien-16,17-dione, 16-oxime, with acetic acid (90 ml.) and water (5.4 ml.) containing zinc dust (7.2 g.) for 30 minutes at 45° when dissolution of the steroid is complete. Add water (81 ml.) and reflux for 1 hour and then cool to 20°. Decant the aqueous liquid and wash the zinc with benzene. Combine the aqueous and benzene washings and treat with 1.5 N sodium hydroxide (690 ml.) and ether (300 ml.). Separate and wash the organic layer with 5 N hydrochloric acid, 5% aqueous sodium carbonate and water. Dry and evaporate the solvent and chromatograph the residue on silica gel. Recrystallize the solid fractions from ethyl acetate to obtain the title product (0.1 g.) M.P. 123–132°.

This compound is useful as an intermediate for preparing the novel compositions of this invention which have hormonal activity.

Example 85.—3-(2-diethylaminoethoxy)-13β-ethyl-8-isogona-1,3,5(10)-trien-17β-ol

Add 13β-ethyl-8-isogona-1,3,5(10)-triene - 3,17β - diol (587 mg., 2.06 m. mole) and diethylaminoethyl chloride hydrochloride (4.5 mg., 2.6 m. mole) to a solution of sodium (100 mg., 4.3 m. mole) in dry ethanol (20 ml.). Heat the mixture under reflux for 2 hours. Evaporate the solvent in vacuo. Treat the residue with water and extract with ether. Extract the ethereal solution with dilute hydrochloric acid and basify the aqueous phase with dilute sodium hydroxide. Extract the mixture with ether, wash the extracts successively with water and brine, and dry over magnesium sulfate. Evaporate the solvent to dryness. Dissolve the residue in dry ether. Add alcoholic hydrogen chloride to precipitate the title compound as the hydrochloride (298 mg., 34%). Recrystallize from ethanol-ether to obtain white needles, M.P. 234–235°; ultraviolet absorption peaks at 275.5 mμ (ε1,720) and 283 mμ (ε1,665). (Found: C, 70.76; H, 9.45; N, 3.46. $C_{25}H_{40}NO_2Cl$ requires: C, 71.14; H, 9.55; N, 3.32%.)

This compound has estrogenic activity, lowers the blood lipid level, and is useful as an intermediate for preparing the hormonal compounds of this invention.

Example 86.—2-diethylaminomethyl-13β-ethyl-3-hydroxy-8-isogona-1,3,5(10)-trien-17-one Dissolve 13β-ethyl-8-isogona-1,3,5(10)-trien-3-ol - 17-one (4.0 g.) and diethylamine (20 ml.) in ethanol (100 ml.), benzene (60 ml.), and 40% formaldehyde (12 ml.). Heat under reflux for 16 hours. Evaporate the mixture under reduced pressure, dilute with water, and extract with ether. Combine the ethereal extracts and treat with 10% hydrochloric acid. Basify the resulting aqueous layer with aqueous ammonia. Extract the mixture with ether, combine the extracts, and dry over magnesium sulfate. Evaporate the solvent to obtain a pale red gum. Dissolve the gum in dry ether and treat with dry hydrogen chloride. Stir at 0° for one hour. Filter off the title compound as the hydrochloride (4.95 g., 87%). Recrystallize from ethanol-ether to obtain the title product as fine, white needles, M.P. 230–231°; ultraviolet absorption peak at 287.5 mμ (ε3,200). (Found: C, 67.89; H, 8.84; Cl, 8.14. $C_{24}H_{36}NO_2Cl \cdot H_2O$ requires: C, 67.97; H, 9.03; Cl, 8.36%). To obtain the free base, dissolve the hydrochloride in water (30 ml.) and treat with 10% sodium hydroxide. Wash and dry the resulting white precipitate.

This compound has estrogenic activity, lowers the blood lipid level, and is useful as an intermediate for preparing the hormonal compounds of this invention.

Example 87.—13β-isopropyl-3-methoxy-8-isogona - 1,3,5(10)-trien-17-one

Dissolve 1.0 g. of 13β-isopropyl-3-methoxygona-1,3,5(10)8,14-pentaen-17-one in ethanol and hydrogenate in the presence of 10% palladized charcoal (0.5 g.) until hydrogen uptake ceases. Work up in the usual manner. Crystallize twice from methanol to obtain the title compound (430 mg.) M.P. 123–214°; ultraviolet absorption peak at 278 mμ (ε1,875).

This compound has estrogenic activity and is useful as an intermediate for preparing the hormonal compounds of this invention.

Example 88.—13β-butyl-3-methoxy-8-isogona-1,3,5(10)-trien-17β-ol

Reflux 13β-butyl-3-methoxygona-1,3,5(10),8,14 - pentaen-17-one (32 g.) with sodium borohydride (3.1 g.) in absolute ethanol to obtain 13β-butyl-3-methoxygona-1,3,5(10),8,14-pentaen-17β-ol (29 g.). Hydrogenate the crude product (5.6 g.) at 1 atmosphere in the presence of 10% palladized charcoal (5 g.) to obtain the title compound (0.7 g.) M.P. 99–101; infrared maxima (potassium bromide) at 3.0μ; ultraviolet absorption peak at 280 mμ (ε2,185). (Found: C, 80.30; H, 9.90. $C_{22}H_{32}O_2$ requires: C, 80.44; H, 9.83%.)

This compound has estrogenic activity, lowers the blood lipid level, and is useful as an intermediate for preparing the hormonal compound of this invention.

Example 89.—13β,17-diethyl-3-methoxy-8-isogona - 1,3,5(10)-trien-17β-ol

Suspend 13β-ethyl-17-ethynyl-3-methoxy-8-isogona-1,3,5(10)-trien-17β-ol (2.0 g.) in methanol (310 ml.) and hydrogenate in the presence of 10% palladized charcoal (700 mg.) until hydrogen uptake ceases. Filter, remove solvent, crystallize, and sublimate to obtain the title compound (500 mg.), M.P. 131–134°. (Found: C, 80.11; H, 9.56. $C_{22}H_{32}O_2$ requires: C, 80.44; H, 9.83%.)

This compound has estrogenic activity and is useful as an intermediate for preparing the hormonal compounds of this invention.

Example 90.—17-(3-diethylamino - 1 - propynyl) - 13β-ethyl--3-methoxy-8-isogona-1,3,5(10)trien-17β-ol Suspend 13β-ethyl-17-ethynyl-3-methoxy-8-isogona-1,3,5(10)-trien-17β-ol (5.4 g.) in a solution of dioxane (40 ml.), water (3.1 ml.), formalin (3.0 ml. of a 40% aqueous solution), diethylamine (2.8 ml.), glacial acetic acid (1.3 ml.), and cuprous chloride (100 mg.). Stir for 22 hours at 60°. Pour the reaction mixture onto ice and basify with 2 N sodium hydroxide to pH 10.0. Filter off the product and recrystallize from ethyl acetate-hexane to obtain the title compound (550 mg.), M.P. 141–142°. (Found: C, 79.23; H, 9.41; N, 3.33. $C_{27}H_{39}O_2N$ requires: C, 79.11; H, 9.60; N, 3.42%.)

This compound has estrogenic activity, lowers the blood lipid level, and is useful as an intermediate for preparing the hormonal compounds of this invention.

Example 91.—13β-ethyl-17-ethynyl-3-methoxy-8-isogona-1,3,5(10)-trien-17β-ol

Dissolve 13β - ethyl-3-methoxy-8-isogona-1,3,5(10)-trien-17-one (10 g.) in 300 ml. of dimethylacetamide. Saturate with acetylene for 45 minutes and then add lithium acetylide-ethylenediamine complex (15.9 g.). Stir the mixture for 4 hours under acetylene. After 15 hours pour the reaction mixture on ice and extract with ether. Wash the ether layer with water, brine, and dry over magnesium sulfate. Evaporate the ether and recrystallize twice from methanol-water to obtain the title compound (6.4 g.), M.P. 139–140.5°; infrared maxima at 2.9, 3.1μ. (Found: C, 81.06; H, 8.63. $C_{22}H_{28}O_2$ requires: C, 81.44; H, 8.70%.)

This compound has estrogenic activity and is useful as an intermediate for preparing the hormonal compounds of this invention.

Example 92.—13β-ethyl-3-methoxy-8-isogona-2,5(10)-dien-17-one, cyclic ethylene acetal To a solution of 2 g. lithium metal in 400 ml. of liquid ammonia, add 50 ml. of tetrahydrofuran and a solution of 2 g. 13β-ethyl-3-methoxy-8-isogona-1,3,5(10)-trien-17-one, cyclic ethylene acetal in 50 ml. of tetrahydrofuran. Stir for 2 hours, add 40 ml. of ethanol during 25 minutes, and extract with ether. Wash, dry, and evaporate to obtain a gum, crystallize with hexane to obtain 1.4 g. product, M.P. 123–126°. Recrystallize from methanol to obtain analytical sample, M.P. 127–130°. IR 5.44, 5.98μ.

Calc'd for $C_{22}H_{32}O_3$: C, 76.70; H, 9.30%. Found: C, 76.63; H, 9.29%.

This compound is useful as an intermediate for preparing the novel compositions of this invention which have hormonal activity.

Example 93.—17β-ethoxy-13β-ethyl-3-methoxy-8-isogona-2,5(10)-diene

Dissolve 17β-ethoxy-13β-ethyl-3-methoxy-8-isogona-1,3,5(10)-triene (2.5 g.) in 1-methoxy-2-propanol (70 ml.), tetrahydrofuran (125 ml.), and liquid ammonia (220 ml.) and treat with lithium (2.5 g.). Add ammonium chloride (25.0 g.) and water. Filter off the title compound (2.1 g.).

This compound is useful as an intermediate for preparing the novel compositions of this invention which have hormonal activity.

Example 94.—13β-ethyl-17α-ethynyl-3-methoxy-8-isogona-2,5(10)-dien-17β-ol

Dissolve 13β-ethyl-3-methoxy-8-isogona-2,5(10)-dien-17-one (4 g.) in dimethylacetamide (150 ml.) and saturate with acetylene. Add lithium acetylide ethylenediamine (2.5 g.) and stir the reaction mixture under acetylene for 4 hours. Pour the reaction mixture over ice and extract with benzene. Wash, dry, and evaporate the organic extract and recrystallize the residue from methanol to obtain the title compound (2.5 g.), M.P. 146–149° C.

This compound is useful as an intermediate for preparing the novel compositions of this invention which have hormonal activity.

Example 95.—17β-ethoxy-13β-ethyl-8-isogon-5(10)-en-3-one

Dissolve 17β-ethoxy-13β-ethyl-3-methoxy-8-isogona-1,3,5(10)-triene (2.5 g.) in 1-methoxy-2-propanol (70 ml.), tetrahydrofuran (125 ml.), and liquid ammonia (220 ml.). Treat with lithium (2.5 g.). Add ammonium chloride (25.0 g.), then water. Filter off the resulting 17β-ethoxy-13β-ethyl-3-methoxy-8-isogona-2,5(10)-diene. Add, while stirring under nitrogen, a solution of methanol (210 ml.), oxalic acid monohydrate (3.0 g.), and water (35 ml.). After 3 hours, precipitate with water and extract with ether. Recrystallize from petroleum ether to obtain the title compound (1.4 g.), M.P. 94.5–96.5°; infrared maximum at 5.84μ. (Found: C, 79.73; H, 10.11. $C_{21}H_{32}O_2$ requires: C, 79.70; H, 10.19%.)

This compound has anabolic and androgenic activity and is useful as an intermediate for preparing the hormonal compounds of this invention.

Example 96.—13β-ethyl-17β-hydroxy-8-isogon-5(10)-en-3-one, cyclic ethylene acetal Reflux 13-ethyl-3-methoxy-8-isogona-2,5(10)-17β-ol (1 g.) with toluene-p-sulfonic acid (0.1 g.) in benzene (50 cc.) and ethylene glycol (2 cc.) for 18 hours with continuous removal of water. Add ether to the cooled reaction mixture and wash with aqueous sodium hydrogen carbonate, water, and dry. Evaporate the solvent to obtain the title compound.

This compound is useful as an intermediate for preparing the novel compositions of this invention which have hormonal activity.

Example 97.—13β-ethyl-8-isogon-5(10)-en-3,17-dione, 3-cyclic ethylene acetal

Dissolve 13β-ethyl-17β-hydroxy-8-isogon-5(10)-en-3-one, cyclic ethylene acetal (1. g.) in pyridine (15 cc.) and add chromium trioxide (1 g.) with cooling. Allow the mixture to stand for 20 hours at 25°, and then add ethyl acetate and filter through a short column of alumina (20 g.). Evaporate the solvent to obtain the title compound; infrared absorption peak at 5.75μ.

This compound is useful as an intermediate for preparing the novel compounds of this invention which have hormonal activity.

Example 98.—17α-ethynyl-13β-ethyl-17-hydroxy-8-isogon-5(10)-en-3-one, cyclic ethylene acetal Dissolve 13β-ethyl-8-isogon-5(10)-ene-3,17-dione, 3-cyclic ethylene acetal (1.5 g.) in dimethylacetamide (50 cc.) and saturate the solution with acetylene. Add lithium acetylide-ethylenediamine (0.8 g.) and stir the mixture under acetylene for 4 hours. Pour over ice, extract with benzene and wash, dry, and evaporate the organic extracts to obtain the title compound; infrared absorption at 3.0, 3.14μ.

This compound is useful as an intermediate for preparing the novel compositions of this invention which have hormonal activity.

Example 99.—13-ethyl-17α-ethynyl-17-hydroxy-8-isogon-5(10)-en-3-one

Dissolve 17α-ethynyl-13β-ethyl-17-hydroxy-8-isogon-5(10)-en-3-one, 3-cyclic ethylene acetal (0.5 g.) in tert-amyl alcohol (10 cc.)-toluene (10 cc.)-5N-hydrochloric acid (40 cc.) and reflux for 10 minutes. Separate the organic layer and evaporate to dryness. Chromatograph the residue on neutral alumina to obtain the title product, M.P. 145–150°.

This compound has estrogenic activity and is useful as an intermediate for preparing the hormonal compounds of this invention.

Example 100.—13β, 17α-diethyl-3-methoxy-8-isogona-2,5(10)-dien-17-ol

Dissolve 13β,17α-diethyl-3-methoxy-8-isogona-2,5(10)-dien-17-ol (0.5 g.) in 1-methoxy-2-propanol (15 cc.), tetrahydrofuran (25 cc.) and liquid ammonia (50 cc.) and treat the stirred solution with lithium (0.7 g.). Add ammonium chloride (5 g.) and water. Filter off the title compound; infrared absorption 5.9, 6.0μ.

This compound is useful as an intermediate for preparing the novel compositions of this invention which have hormonal activity.

Example 101.—13β,17α-diethyl-17-hydroxy-8-isogon-4[and 5(10)]-en-3-one

Stir 13β,17α-diethyl-3-methoxy-8-isogona-2,5(10)-dien-17-ol (0.7 g.) with methanol (20 cc.) and 6 N hydrochloric acid (10 cc.) for 30 minutes. Add water and extract with ether. Wash, dry, and evaporate the ethereal solution and recrystallize the residue from ethyl acetate hexane to obtain a mixture of the title products.

This compound has anabolic and androgenic activity and is useful as an intermediate for preparing the hormonal compounds of this invention.

Example 102.—13β-ethyl-3-pyranyloxy-8-isogona-1,3,5(10)-trien-17-one

Dissolve 13β-ethyl-3-hydroxy-8-isogona-1,3,5(10)-trien-17-one (3.2 g.) in a mixture of benzene (12 cc.), methanol (0.25 cc.), pyridine (0.4 cc.) and acetyl chloride (0.3 cc.), and add dihydropyran (5.0 g.) in benzene (12 cc.). Stir the mixture for seven days at 25° C. and then add benzene (40 cc.) and wash thoroughly with concentrated aqueous sodium carbonate and then with water. Evaporate the solution to dryness and recrystallize from methanol to obtain the title compound (3.1 g.), M.P. 112–114°.

This compound is useful as an intermediate for preparing the novel compositions of this invention which have hormonal activity.

Example 103.—13β-ethyl-17α-ethynyl-8-isogona-1,3,5(10)-trien-3,17-diol

Pass excess acetylene through a solution of lithium aluminum hydride (1.5 g.) in tetrahydrofuran (40 cc.) and add dropwise a solution of 13β-ethyl-3-pyranyloxy-8-isogona-1,3,5(10)-trien-17-one (1.0 g.) in tetrahydrofuran (18 cc.). Stir the mixture for sixteen hours at 25°, decompose with water, acidify with hydrochloric acid and extract with ether. Wash, dry, and evaporate the organic solution and crystallize the residue from chloroform-ether to give the title compound (0.4 g.), M.P. 181–185°.

This compound has estrogenic activity and is useful as an intermediate for preparing the novel compositions of this invention which have hormonal activity.

Example 104.—13β-ethyl-3-methoxygona-1,3,5(10),8,14,16-hexaen-17-ol, acetate

Reflux 13β-ethyl - 3 - methoxy-8-isogona-1,3,5(10),8,14-pentaen-17-one (3 g.) with isopropenyl acetate (45 cc.) and toluene-p-sulfonic acid (0.5 g.) for 3 hours with distillation of ca. 20 cc. of the solvent. Dilute the cooled solution with ether and wash with water and dry. Evaporate the solution to dryness and dissolve the solid residue in petroleum-benzene and filter through a column of Florisil (15 g.). Recrystallize the product from ethanol-hexane to give the title compound (1.8 g.), M.P. 119–120. (Found: C, 78.32; H, 7.00. $C_{22}H_{24}O_3$ requires: C, 78.43; H, 7.19%).

This compound is useful as an intermediate for preparing the novel compositions of this invention which have hormonal activity.

Example 105.—13β-ethyl-3-methoxygona-1,3,5(10), 8,14,16-hexaen-17-ol, acetate

Reflux 13-ethyl - 3 - methoxy-8,14-secogona-1,3,5(10),9-tetraene-14,17-dione (1.5 g.) with isopropenyl acetate (25 cc.) and toluene-p-sulfonic acid (0.25 g.) for 4 hours with distillation of ca. 10 cc. of the solvent. Cool, dilute with ether and wash and dry the organic solution. Filter the solid residue through a short column of Florisil and recrystallize the product from ethanol-hexane to give the title compound, M.P. 119–120°.

This compound is useful as an intermediate for preparing the novel compositions of this invention which have hormonal activity.

Example 106.—3-methoxy-13β-methylgona-1,3,5(10),8,14,16-hexaen-17-ol, acetate

Reflux 3 - methoxy - 13β - methylgona-1,3,5(10),8,14-pentaen-17-one (0.5 g.) with toluene-p-sulfonic acid (0.1 g.) in isopropenyl acetate (9 cc.) for 15 hours. Distil 5 cc. of solvent over one hour and then cool the solution, dilute with ether and wash the solution with aqueous sodium hydrogen carbonate, water and dry. Evaporate the solvent and recrystallize the residue from ethanol to give the title compound, M.P. 133–135° (0.27 g.); ultraviolet absorption maximum at 357μ ($\epsilon$25,600).

This compound is useful as an intermediate for preparing the novel compositions of this invention which have hormonal activity.

Example 107.—3-methoxy-13β-methylgona-1,3,5(10),8,14,16-hexaen-17-ol, acetate

Reflux 13 - methyl - 3 - methoxy-8,14-secogona-1,3,5(10),9-tetraene-14,17-dione (1.5 g.) with isopropenyl acetate (25 cc.) and toluene-p-sulfonic acid (0.25 g.) for 4 hours with distillation of ca. 10 cc. of the solvent. Cool, dilute with ether and wash and dry the organic solution. Filter the residue through a short column of Florisil with petrol-benzene and recrystallize the product from ethanol to give the title product, M.P. 133–135°; ultraviolet absorption maximum at 357μ ($\epsilon$26,000).

This compound is useful as an intermediate for preparing the novel compositions of this invention which have hormonal activity.

Example 108.—3-methoxy-13β-methyl-8-isogona-1,3,5(10)-trien-17β-ol, acetate

Hydrogenate 3 - methoxy-13β-methylgona-1,3,5(10),8,14,16-hexaen-17-ol, acetate (1 g.) in tetrahydrofuran (20 cc.) and ethanol (30 cc.) at atmospheric pressure in the presence of 10% palladized charcoal until uptake of hydrogen ceases. Filter the catalyst, evaporate the solvent and recrystallize the product from methanol to obtain the title compound.

This compound has estrogenic activity and is useful as an intermediate for preparing the hormonal compounds of this invention.

Example 109.—13β-ethyl-3-methoxy-8-isogona-1,3,5(10)-trien-17β-ol, acetate

Hydrogenate 13β - ethyl-3-methoxygona-1,3,5(10),8,14,16-hexaen-17-ol, acetate (1.15 g.) in tetrahydrofruran (10 cc.) and ethanol (10 cc.) at atmospheric pressure in the presence of 10% palladized charcoal until uptake of hydrogen ceases. Filter the catalyst, evaporate the solvent and chromatograph the residue on neutral alumina (20 g.). Recrystallize from ethanol to obtain the title compound, M.P. 94–97°.

This compound has estrogenic activity and is useful as an intermediate for preparing the hormonal compounds of this invention.

Example 110.—17-ethoxy-13β-ethyl-3-methoxygona-1,3,5(10),8,14,16-hexaene

Dissolve 13β - ethyl - 3 - methoxygona-1,3,5(10),8,14-pentaen-17-one (1 g.) in ethanol (4 cc.) and ethyl orthoformate (1 cc.), add concentrated sulfuric acid (1 drop) and keep the mixture at 45° for one-half hour. Add ethyl orthoformate (0.5 cc.) and keep the mixture at 55° for a further one-half hour. Pour the cooled mixture into saturated aqueous sodium hydrogen carbonate and isolate the product with ether. Filter the product through a column of Florisil with hexane containing 10% benzene and recrystallize the product from ethanol to obtain the title compound (0.42 g.), M.P. 79–81°; ultraviolet absorption maxima at 353μ ($\epsilon$25,000).

This compound is useful as an intermediate for preparing the novel compositions of this invention which have hormonal activity.

Example 111.—17-ethoxy-13β-ethyl-3-methoxy-8-isogona-1,3,5(10)-triene

Hydrogenate 17-ethoxy - 13β - ethyl-3-methoxygona-1,3,5(10),8,14,16-hexaene (1 g.) in tetrahydrofuran (15 cc.) and ethanol (15 cc.) in the presence of 10% palladized charcoal (0.8 g.) until uptake of hydrogen ceases. Filter the catalyst, evaporate the solvent and recrystallize the residue from aqueous methanol to obtain the title compound, M.P. 89–91°

This compound has estrogenic activity, lowers the blood lipid level, and is useful for preparing the novel compositions of this invention.

Example 112.—13β-ethyl-3-methoxy-8-isogona-1,3,5(10)-trien-17-one

Hydrogenate 13β-ethyl - 3 - methoxygona-1,3,5(10),8- tetraen-17-one (0.1 g.) in methanol (20 cc.) in the presence of a 10% palladium on charcoal catalyst (0.05 g.) until hydrogen uptake ceases. Remove the catalyst and evaporate the solvent and crystallize the residue from methanol to give the title compound, M.P. 93–96°.

To prepare 13β - ethyl-3-methoxy-8-isogona-1,3,5(10)-trien-17β-ol hydrogenate 13β - ethyl-3-methoxygona-1,3,5(10),8-tetraen-17β-ol according to the mainpulative procedure described above.

To prepare 13β - ethyl-3-methoxy-8-isogona-1,3,5(10)-trien-17β-ol, acetate hydrogenate 13β-ethyl-3-methoxygona-1,3,5(10),8-tetraen-17β-ol, acetate according to the manipulative procedure described above.

These compounds have estrogenic activity, lower the blood lipid level and are useful as intermediates for prepairing the hormonal compounds of this invention.

Example 113.—2,3-dimethoxy-13β-methyl-8-isogona-1,3,5(10)-trien-17β-ol

Slurry 2,3-dimethoxy-13β - methyl - 8 - isogona - 1,3,5(10)-trien-17-one (500 mg.) in methanol (75 ml.) and treat with NaBH₄ (1.0 g.). Crystallize the product from methylcyclohexane to give the title compound (250 mg.), M.P. 121–123°.

Infrared absorption: 2.93, 6.21, 6.60μ. Found: C, 76.03; H, 8.83. $C_{20}H_{28}O_3$ requires: C, 75.91; H, 8.92.

This compound has estrogenic activity and is useful as an intermediate for preparing the hormonal compounds of this invention.

Example 114.—3-acetoxy-13-methyl-8-isogona-1,3,5(10)-trien-17-one

Heat 3-hydroxy-13-methyl - 8 - isogona - 1,3,5(10)-trien-17-one (7.2 g.) with acetic anhydride (24 cc.) in pyridine (40 cc.) at 100° for 90 minutes. Remove the solvents in vacuo and recrystolline the residue from residue from ethanol to obtain the title compound (7.4 g.), M.P. 138–140°.

This compound has estrogenic activity and is useful as an intermediate for preparing the hormonal compounds of this invention.

Example 115.—17-acetoxy-2,3-dimethoxy-13-methyl-8-isogona-1,3,5(10),16-tetraene

Heat 2,3 - dimethoxy - 3 - methyl-8-isogona-1,3,5(10)-trien-17-one (0.5 g.) in isopropenyl acetate (8 cc.) with p-toluenesulfonic acid (0.08 g.) at 100° for 18 hours and then gradually distil the solvent over a period of 2 hours until the volume is reduced to ca. 2 cc. Dilute the cooled solution with ether (50 cc.) and wash with saturated aqueous sodium bicarbonate and brine. Dry and evaporate the organic solution and absorb the resultant in dark red oil on a column of Florex (25 g.) and elute with benzene-hexane (1:1). Evaporate the eluates and recrystallize from methanol to obtain the title compound (0.24 g.), M.P. 110-120°; infrared absorption peaks at 5.67, 6.14, and 6.23μ.

This compound is useful as an intermediate for preparing the novel compositions of this invention which have hormonal activity.

Example 116.—17β-acetoxy-2,3-dimethoxy-16,17-epoxy-13-methyl-8-isogona-1,3,5(10)-triene Treat 17 - acetoxy-2,3-dimethoxy-13-methyl-8-isogona-1,3,5(10),16-tetraene (0.25 g.) in benzene (5 cc.) with m-chloroperbenzoic (0.18 g.) and allow to stand at 25° for 3 hours. Pour into cold aqueous sodium bicarbonate, and wash the organic solution with brine and dry. Remove the solvent and crystallize the residue from acetone to obtain the title compound (0.12 g.) M.P. 152–160°; ultraviolet absorption maxima at 282–290 mμ (ε3,530); infrared absorption peaks at 5.69 and 6.22μ.

$C_{22}H_{28}O_5$ calculated: C, 70.94; H, 7.57%. Found: C, 71.12; H, 7.62%.

This compound is useful as an intermediate for preparing the novel compositions of this invention which have hormonal activity.

Example 117.—2,3-dimethoxy-13-methyl-8-isogona-1,3,5(10)-trien-16α-ol-17-one

Dissolve 17β - acetoxy - 2,3-dimethoxy-16,17-epoxy-13-methyl-8-isogona 1,3,5(10)-triene (0.25 g.) in warm methanol (37 cc.) and acetone (9.3 cc.). Cool to 25° and add 6 N sulfuric acid (7.5 cc.). Allow the mixture to stand for four days and then dilute with an equal volume of ethyl acetate. Cool to 0° and basify with ice-cold aqueous sodium bicarbonate. Separate the organic layer, extract the equeous solution with ethyl acetate and wash the combined organic solutions with water and dry. Evaporate the solvent and recrystallize the residue from methanol to obtain the title compound (0.14 g.), M.P. 203–7°; infrared absorption peaks at 2.89, 5.73, 6.20μ.

$C_{20}H_{26}O_4$ Calculated: C, 72.69; H, 7.90%. Found: C, 72.74; H, 8.06%.

This compound has estrogenic activity and is useful as an intermediate for preparing the hormonal compounds of this invention.

Example 118.—2,3-dimethoxy-13-methyl-8-isogona-1,3,5(10)-trien-16α,17β-diol

Add 17β-acetoxy-2,3-dimethoxy-16,17-epoxy-13-methyl-8-isogona-1,3,5(10)-triene (0.25 g.) in dry ether (25 cc.) dropwise to a stirred suspension of lithium aluminum hydride (0.7 g.) in ether (75 cc). Reflux for four hours and then stir at 25° for 16 hours. Decompose the excess lithium aluminum hydride by adding water (1 cc.) cautiously, followed by 15% aqueous sodium hydroxide (1 cc.) and more water (1 cc.). Filter the mixture, evaporate the filtrate and recrystallize the residue from ethyl acetate to obtain the title compound (0.06 g.), M.P. 195–199°; infrared absorption peaks at 3.1, 6.21 and 6.63μ.

This compound has estrogenic activity and is useful as an intermediate for preparing the hormonal compounds of this invention.

Example 119.—2,3-dimethoxy-13-methyl-8-isogona-1,3,5(10)-trien-16α,17β-diol

Add sodium borohydride (0.5 g.) to a stirred suspension of 2,3-dimethoxy-13-methyl-8-isogona-1,3,5(10)-trien-16α-ol-17-one (0.1 g.) in methanol (100 cc.) and continue stirring for 2 hours. Evaporate the methanol under reduced pressure and recrystallize the residue from ethyl acetate to obtain the title compound (0.06 g.), M.P. 203–205°; ultraviolet absorption peaks at 225, 285 and 291 mμ (ε8,960, 3,940 and 3,710); infrared peaks at 3.1, 6.22 and 6.63μ.

$C_{20}H_{28}O_4$ calculated: C, 72.26; H, 8.49%. Found: C, 71.72; H, 8.79%.

This compound has estrogenic activity and is useful as an intermediate for preparing the hormonal compounds of this invention.

Example 120.—17-acetoxy-13-ethyl-3-methoxy-8-isogona-1,3,5(10),16-tetraene

Add concentrated sulfuric acid (3 drops) to isopropenyl acetate (5 cc.) and then add 1.5 cc. of this solution to a mixture of 13-ethyl-3-methoxy-8-isogona-1,3,5(10)-trien-17-one (4.0 g.) in isopropenyl acetate (30 cc.). Reflux the mixture for 3 hours, and then slowly distil the solvent until ca. 10 cc. remains. Add ether (10 cc.) to the cooled solution and wash with cold 10% aqueous sodium bicarbonate, water, brine and dry. Evaporate the solvent, dissolve the residue in hot hexane (150 cc.) and pass through a column of Florex (70 g.), eluting with hexane (500 cc.) and benzene (800 cc.). Evaporate the eluate to obtain the title compound (2.19 g.) as a white solid, M.P. 94.8–95.2°; infrared absorption peaks at 5.68, 6.23 and 6.67μ.

$C_{22}H_{28}O_3$ calculated: C, 77.61; H, 8.29%. Found: C, 77.65; H, 7.96%.

This compound is useful as an intermediate for preparing the novel compositions of this invention which have hormonal activity.

Example 121.—3,17-diacetoxy-13-ethyl-8-isogona-1,3,5(10),16-tetraene

Add 2 cc. of a solution of concentrated sulphuric acid (4 drops) in isopropenyl acetate (5 cc.) to a mixture of 13-ethyl-3-methoxy-8-isogona-1,3,5(10)-trien-17-one (4.3 g.) and isopropenyl acetate (30 cc.) and reflux the mixture for 2½ hours. Slowly distil the solvent over 4 hours until ca. 10 cc. remains. Add isopropenyl acetate (20 cc.) and 1 cc. of the above solution of sulphuric acid in isopropenyl acetate and slowly distil the solvent over a period of 3 hours until 10 cc. remains. Add ether (100 cc.) to the cooled solution and wash with cold 10% aqueous sodium bicarbonate, water, brine and dry. Evaporate the solvent and dissolve the residue in hexane-benzene (9:1; 150 cc.) and chromatograph on a column of Florex (60 g.), eluting with hexane and benzene (500 cc.). Evaporate the eluate to obtain the title compound (2.47 g.), M.P. 99–100°; infrared absorption peaks at 5.68, 5.72, 6.21, and 6.72μ.

$C_{23}H_{28}O_4$ calculated: C, 74.97; H, 7.66%. Found: C, 75.04; H, 7.62%.

This compound is useful as an intermediate for preparing the novel compositions of this invention which have hormonal activity.

Example 122.—3,17-diacetoxy-13-methyl-8-isogona-1,3,5(10)-triene

Reflux 3-acetoxy-13-methyl-8-isogona-1,3,5(10)-trien-17-one (5 g.) with p-toluenesulfonic acid (1.5 g.) in isopropenyl acetate (100 cc.) for 16 hours, and then slowly distill the solvent until ca. 15 cc. remains. Add ether and wash the organic solution with aqueous sodium bicarbonate, water brine and dry. Evaporate the solvent and recrystallize the residue from ethanol and then benzene-heptane to obtain the title compound, M.P. 113.8–114.8°.

This compound has estrogenic activity and is useful as an intermediate for preparing the hormonal compounds of this invention.

Example 123.—13-methyl-8-isogona-1,3,5(10)-trien-3,16α,17β-triol

Add m-chloroperbenzoic acid (2.5 g.) to a solution of 3,17 - diacetoxy - 13 - methyl - 8 - isogona - 1,3,5(10),16 - tetraene (3.65 g.) in benzene (60 cc.) and stir for 48 hours at 25°. Filter and wash the filtrate with 3% aqueous potassium carbonate, water, brine and dry. Evaporate the solvent, dissolve the residue in tetrahydrofuran (80 cc.) and add the solution to a stirred suspension of lithium aluminum hydride (8 g.) in ether (200 cc.). Stir for 30 minutes and then reflux for 1 hour. Add ethyl acetate (75 cc.) dropwise to the cooled solution, and then 10% hydrochloric acid (200 cc.) and concentrated hydrochloric acid (50 cc.).

Separate the organic layer, extract the aqueous solution with ethyl acetate and wash the combined organic solution with 10% aqueous sodium bicarbonate, water, brine and dry. Evaporate the solvent and treat the residue with hot methanol and charcoal. Filter dilute with benzene and filter the precipitate to obtain the title product (0.58 g.). Recrystallize from methanol to obtain a pure sample, M.P. 266–268°; infrared absorption peaks at 3.0–3.3 (broad), 6.22, 6.67μ.

$C_{18}H_{24}O_3$ calculated: C, 74.97; H. 8.39%. Found: C, 75.15; H, 7.67%.

This compound has estrogenic activity and is useful as an intermediate for preparing the hormonal compounds of this invention.

Example 124.—3-methoxy-13-methyl-8-isogona-1,3,5(10)-trien-16α,17β-diol

Add m-chloroperbenzoic acid (1.5 g.) to a solution of 17 - acetoxy - 3 - methoxy - 13 - methyl - 8 - isogona - 1,3,5(10),16-tetraene (1.58 g.) in benzene (50 cc.) and stir the solution at 25° for 45 hours. Filter, wash the filtrate with 3% aqueous potassium carbonate, water, brine and dry. Evaporate the solvent, dissolve the residue in tetrahydrofuran (80 cc.) and add the solution dropwise to a stirred suspension of lithium aluminum hydride (3.5 g.) in ether (200 cc.). Stir for 30 minutes and then reflux for 1 hour. Add ethyl acetate (75 cc.) slowly to the cooled solution followed by 10% hydrochloric acid (200 cc.) and concentrated hydrochloric acid (50 cc.). Separate the organic layer and extract the aqueous solution with ethyl acetate. Wash the combined organic extracts with 10% aqueous sodium bicarbonate, water and brine, and dry and evaporate the solvent.

Dissolve the residue in hot methanol, treat with activated charcoal, filter and reduce the volume of filtrate to 10 cc. Cool to 10°, and filter the precipitate to obtain the title compound (0.5 g.). Recrystallize further from ethyl acetate and then from methanol to obtain the pure compound, M.P. 186–187.8°; infrared absorption peaks at 3.1, 6.22, 6.67μ.

This compound has estrogenic activity and is useful as an intermediate for preparing the hormonal compounds of this invention.

Example 125.—13-ethyl-3-methoxy-8-isogona-1,3,5(10)-trien-16α,17β-diol

Add m-chloroperbenzoic acid (2 g.) to a solution of 17 - acetoxy - 13 - ethyl - 3 - methoxy - 8 - isogona - 1,3,5(10),16-tetraene (2.19 g.) in benzene (50 cc.) and stir for 45 hours at 25°. Filter, wash the filtrate with 3% aqueous potassium carbonate, water and brine, and dry. Evaporate the solvent and dissolve the residue in tetrahydrofuran (80 cc.) and add the solution dropwise to a stirred suspension of lithium aluminum hydride (3.5 g.) in ether (200 cc.). Stir for 30 minutes, reflux for 1 hour, and then add ethyl acetate (75 cc.) slowly to the cooled solution followed by 10% hydrochloric acid (200 cc.) and concentrated hydrochloric acid (50 cc.). Separate the aqueous layer and extract the aqueous solution with ethyl acetate. Wash, dry and evaporate the combined organic solution, take up the residue in hot methanol and treat with activated charcoal. Filter, evaporate the filtrate to ca. 10 cc. and allow to stand at 10°. Filter the precipitate to obtain the title compound (0.4 g.). Recrystallize from ether to obtain the compound as a monohydrate, M.P. 96–98°; infrared absorption peaks at 3.08, 6.22, 6.67μ. Crystallize further from 95% ethanol to obtain the product as a hemihydrate, M.P. 114–117°.

$C_{20}H_{28}O_{3-1/2}H_2O$ calculated: C, 73.81; H, 8.98%. Found: C, 73.89; H, 9.08%.

This compound has estrogenic activity and is useful as an intermediate for preparing the hormonal compounds of this invention.

Example 126.—13-methyl-8-isogona-1,3,5(10)-trien-3,17β-diol

Dissolve 3 - hydroxy - 13 - methyl - 8 - isogona - 1,3,5 (10)-trien-17-one (9.2 g.) in warm methanol (150 cc.) and tetrahydrofuran (50 cc.), allow to cool to 25°, and then add sodium borohydride (9.0 g.) to the stirred solution in small portions with ice cooling. Stir for 2 hours, evaporate to about 100 cc. and add water (300 cc.). Filter the precipitate and dry. Dissolve in hot methanol, treat with activated charcoal, filter and reduce the volume to 20 cc. Add benzene (20 cc.) and reduce the volume to 30 cc. Allow to stand and then filter the title compound (5.9 g.), M.P. 180–183°. Further purify from ethyl acetate-benzene to obtain the hemihydrate, M.P. 185.5–186.8°. Dry at 105° in vacuo for 6 hours to obtain the pure compound, M.P. 209.5–210.5°.

$C_{18}H_{24}O_2$ calculated: C, 79.37; H, 8.88%. Found: C, 79.16; H, 8.89%.

This compound has estrogenic activity and is useful as an intermediate for preparing the hormonal compounds of this invention.

Example 127.—13-ethyl-8-isogona-1,3,5(10)-trien-3,16α,17β-triol

Add m-chloroperbenzoic acid (2.0 g.) to a solution of 3,17 - diacetoxy - 13 - ethyl - 8 - isogona - 1,3,5(10),16 - tetraene (2.47 g.) in benzene (20 cc.) and stir at 25° for 17 hours.

Dilute with ether and wash with 3% aqueous potassium carbonate, water, brine and dry. Evaporate the solvent, dissolve the residue in ether(50 cc.) and add the solution to a stirred suspension of lithium aluminum hydride (50 g.) in ether (100 cc.). Reflux for 2 hours and add ethyl acetate (50 cc.) dropwise to the cooled reaction mixture, followed by 10% hydrochloric acid (100 cc.) and concentrated hydrochloric acid (25 cc.). Separate the organic layer, extract the aqueous solution with ethyl acetate and wash, dry and evaporate the combined organic solutions. Dissolve the residue in hot methanol, treat with activated charcoal, filter and evaporate to dryness. Add dry benzene and evaporate and triturate the residue with ether to obtain the title compound (1.63 g.). Obtain the pure compound by recrystallizing twice from methanol, M.P. 254–256°; infrared absorption peaks at 3.0–3.3 (broad), 6.18 and 6.68μ.

$C_{19}H_{26}O_3$ calculated: C, 75.46; H, 8.67%. Found: C, 75.71; H, 8.33%.

This compound has estrogenic activity and is useful as an intermediate for preparing the hormonal compounds of this invention.

Example 128.—13-ethyl-3-methoxy-8-isogona-1,3,5(10)-trien-17β-ol, toluenesulfonate Stir a mixture of 13-ethyl-3-methoxy-8-isogona-1,3,5(10)-trien-17β-ol (3.0 g.) and p-toluenesulfonyl chloride (3.0 g.) in pyridine (25 cc.) at 25° for 20 hours. Pour into 5% potassium carbonate solution, filter and dry. Dissolve in methylene chloride, treat with activated charcoal, filter, reduce to low volume and add ethyl acetate. Filter the precipitate to obtain the title compound (3.83 g.), M.P. 189–190.5°; infrared absorption peaks at 6.20, 6.67, 7.37, and 8.52μ.

$C_{27}H_{34}O_4S$ calculated: C, 71.33; H, 7.54; S, 7.05%. Found: C, 71.33; H, 7.44; S, 7.1%.

This compound has estrogenic activity and is useful as an intermediate for preparing the hormonal compounds of this invention.

Example 129.—13-methyl-3-methoxy-8-isogona-1,3,5(10)-trien-17β-ol, hydrogen sulfate, potassium salt Add sulfur trioxide-pyridine complex (2.0 g.) to a solution of 13-methyl-3-methoxy-8-isogona-1,3,5(10)-trien-17β-ol (1.5 g.) in pyridine (15 cc.) and stir the mixture at 100° for 2 hours. Cool, add potassium carbonate (3.5 g.) in water (50 cc.) and stir for 1 hour. Filter the precipitate, wash with water and acetone and dry to obtain the title product (0.91 g.) as a hydrate, M.P. 281–282°.

$C_{19}H_{25}O_5SK \cdot H_2O$ calculated: C, 54.0; H, 6.44; S, 7.59; K, 9.25%. Found: C, 54.34; H, 6.53; S, 6.3; K, 9.8%.

This compound has estrogenic activity and is useful as an intermediate for preparing the hormonal compounds of this invention.

Example 130.—13-methyl-3-methoxy-8-isogona-1,3,5(10)-trien-17β-ol, hydrogen sulfate, potassium salt Stir a mixture of 13-methyl-3-methoxy-8-isogona-1,3,5(10)-trien-17β-ol (2.0 g.) and sulfonic acid (2.0 g.) in pyridine (15 cc.) at 80° for 15 minutes and then at 25° for 1 hour. Add a solution of potassium carbonate (3.0 g.) in water (50 cc.) and stir for a further hour. Filter and dry to obtain the title compound (2.43 g.), M.P. 280–281°. Recrystallize from water to obtain 1.55 g. of product, M.P. 280–281° after drying.

$C_{19}H_{25}O_5SK$ calculated: C, 56.40; H, 6.23%. Found: C, 56.71; H, 6.33%.

This compound has estrogenic activity and is useful as an intermediate for preparing the hormonal compounds of this invention.

Example 131.—13-ethyl-3-methoxy-8-isogona-1,3,5(10)-trien-17β-ol, hydrogen sulfate, potassium salt Stir a mixture of 13-ethyl-3-methoxy-8-isogona-1,3,5(10)-trien-17β-ol (1.2 g.) and sulfur trioxide-pyridine complex (1.0 g.) in pyridine (15 cc.) at 100° for 2 hours. Cool to 25°, add a solution of potassium carbonate (2.0 g.) in water (25 cc.) and continue stirring for 30 minutes. Evaporate to low volume, filter the precipitate and wash with acetone and dry to obtain the title compound (1.75 g.). Recrystallize from water and dry at 100° in vacuo to obtain the pure compound M.P. 300–305°; infrared absorption peaks at 6.22, 6.66, 8.1 (broad) μ.

$C_{20}H_{27}O_5SK$ calculated: C, 57.38; H, 6.50; S. 7.66; K, 9.35%. Found: C, 57.11; H, 6.70; S, 6.3; K, 9.5%.

This compound has estrogenic activity and is useful as an intermediate for preparing the hormonal compounds of this invention.

Example 132.—13-ethyl-8-isogona-1,3,5(10)-trien-3,17β-diol, di-hydrogen sulphate, potassium salt Stir a mixture of 13-ethyl-8-isogona-1,3,5(10)-trien-3,17β-diol (1.5 g.) and sulfur trioxide-pyridine complex (2.0 g.) in pyridine (15 cc.) at 100° for 90 minutes. Add a solution of potassium carbonate (2.0 g.) in water (25 cc.) to the cooled solution and continue stirring for 30 minutes.

Evaporate to low volume, filter the precipitate and triturate with ethanol. Dissolve in hot ethanol, treat with activated charcoal, filter, evaporate the filtrates to low volume and allow to crystallize. Filter and dry to obtain the title product (1.68 g.) as a dimethanolate, M.P. 277–278°; infrared peaks at 2.96, 6.22, 6.7, 8.1μ.

$C_{19}H_{24}O_8S_2K_2 \cdot 2 CH_3OH$ calculated: C, 42.98; H, 5.5; S, 10.93; K, 13.33%. Found: C, 42.8; H, 5.27; S, 10.2; K, 13.6%.

This compound has estrogenic activity and is useful as an intermediate for preparing the hormonal compounds of this invention.

Example 133.—17α-chloroethynyl-13β-ethyl-3-methoxy-8-isogona-1,3,5(10)-trien-17β-ol Add methyl lithium (59 cc. of a 1.7 M. ethereal solution) to dry ether (100 cc.) at 0° in an atmosphere of nitrogen and then add cis-1,2-dichloroethylene (5.9 g.) in ether (50 cc.) dropwise at 0° over a period of 30 minutes. Allow the flask to warm to 25° and then add 13β-ethyl-3-methoxy-8-isogona-1,3,5(10)-trien-17-one (2.98 g.) and stir for 5 hours at 25°. Add saturated aqueous ammonium chloride (100 cc.), separate the organic layer, wash with water, brine and then dry. Evaporate the solvent, dissolve the residue in hexane-benzene (1:1) and chromatograph on silica gel (100 g.). Wash the column with hexane-benzene (1:1; 300 cc.) hexane-benzene (1:3, 200 cc.) and then benzene (700 cc.). Evaporate the benzene eluate to obtain the title compound (1.8 g.) as a colorless glass; infrared absorption maxima at 2.98, 4.55, 6.22, 6.67μ.

$C_{22}H_{27}O_2Cl$ calculated: C, 73.62; H, 7.58; Cl, 9.88%. Found: C, 73.34; H, 7.76; Cl. 9.9%.

The subject matter which the applicants regard as their invention is particularly pointed out and distinctly claimed as follows:

1. A chemical compound having the 8-isogonane nucleus, wherein the nucleus has the A-ring aromatic, said nucleus having attached thereto, in the 13-position, a polycarbonalkyl radical containing from 2 to about 16 carbon atoms.

2. A chemical compound having the 8-isogonane nucleus, wherein the nucleus has a double bond at the 2- and 5(10)-position, said nucleus having attached thereto, in the 13-position, a polycarbonalkyl radical containing from 2 to about 16 carbon atoms.

3. A chemical compond having the 8-isogonane nucleus, wherein the nucleus has a double bond at the 5(10)-position, said nucleus having attached thereto in the 13-position, a polycarbonalkyl radical containing from 2 to about 16 carbon atoms.

4. A mixture of a compound having the 8-isogonane nucleus, wherein the nucleus has a double bond at the 5(10)-position, said nucleus having attached thereto in the 13-position, a polycarbonalkyl radical containing from 2 to about 16 carbon atoms, and its 8-isogonane isomer, wherein said isomer has a double bond at the 4-position.

5. 13-polycarbon-alkyl-8-isogona-1,3,5(10) - trien - 17-ol wherein the 13-polycarbonalkyl group contains 2 to about 16 carbon atoms.

6. 17-alkynyl-13-polycarbon-alkyl-8-isogona-1,3,5(10)-trien-17-ol wherein the 13-poly-carbonalkyl group contains 2 to about 16 carbon atoms.

7. 17-alkynyl-13-polycarbon-alkyl - 8 - isogon - 5(10)-ene-17β-ol. wherein the 13-polycarbonalkyl group contains 2 to about 16 carbon atoms.

8. 13β-ethyl - 3 - methoxy - 8 - isogona-1,3,5(10)-trien-17β-ol.

9. 13β-ethyl-8-isogona-1,3,5(10)-triene-3,17β-diol.

10. 13β-ethyl-3-methoxy - 8 - isogona-1,3,5(10)-triene-16α,17β-diol.

11. 13β-ethyl - 8 - isogona - 1,3,5(10)-triene-3,16α,17β-triol.

12. 13β-ethyl-17α - ethynyl-3-methoxy-8-isogona-1,3,5-(10)-triene-17β-ol.

13. 13β-ethyl-17α-ethynyl-8-isogona - 1,3,5(10) - trien-3,17β-diol.

14. 13β-ethyl-8-isogona-1,3,5(10)-trien-3-ol-17-one.

15. 13β-ethyl-3-methoxy - 8 - isogona - 1,3,5(10)-trien-17-one.

16. 13β-propyl-8-isogona-1,3,5(10)-trien-3-ol-17-one.

17. 3-allyloxy-13β-ethyl - 8 - isogona - 1,3,5(10)-trien-17β-ol.

18. 13β-ethyl-3-hydroxy - 8 - isogona - 1,3,5(10)-trien-17-one, hydrogen sulfate, potassium salt.

19. 13β-ethyl-3-methoxy - 8 - isogona - 1,3,5(10)-trien-17β-ol, hydrogen sulfate, potassium salt.

20. 13β-ethyl - 3 - methoxy - 8 - isogona-2,5(10)-dien-17-one.

21. 13β-ethyl-17α-ethynyl-8-isogona-5(10)-en - 17β-ol-3-one.

22. 17α-chloroethynyl - 13β - ethyl - 3 - methoxy-8-isogona-1,3,5(10)-trien-17β-ol.

23. 17-acetoxy-13β-ethyl-3-methoxygona - 1,3,5(10),8,14,16-hexaene.

24. 17-ethoxy-13β-ethyl-3-methoxygona - 1,3,5(10),8,-14,16-hexaene.

25. A process for preparing a compound having the 8-isogonane nucleus, wherein the nucleus has the A-ring aromatic, comprising: selectively hydrogenating a compound having the gonane nucleus, wherein the nucleus has the A-ring aromatic, and 8-position and 14-position double bonds, and wherein the 7-position carbon atom bears a group which will not undergo enol-keto tautomerization in the presence of a hydrogenation catalyst.

References Cited
UNITED STATES PATENTS

| | | | |
|---|---|---|---|
| 2,700,674 | 1/1955 | Velluz et al. | 260—397.4 |
| 2,712,027 | 6/1955 | Rosenkranz et al. | 260—397.45 |

HENRY A. FRENCH, *Primary Examiner.*